US011640429B2

(12) United States Patent
Furtwangler et al.

(10) Patent No.: US 11,640,429 B2
(45) Date of Patent: May 2, 2023

(54) GRAPH VIEWS TO IMPROVE USER INTERFACE RESPONSIVENESS

(71) Applicant: Home Box Office, Inc., New York, NY (US)

(72) Inventors: Steven N. Furtwangler, Okemos, MI (US); Sata Busayarat, Seattle, WA (US); Brandon C. Furtwangler, Issaquah, WA (US)

(73) Assignee: HOME BOX OFFICE, INC., New York, NY (US)

( * ) Notice: Subject to any disclaimer, the term of this patent is extended or adjusted under 35 U.S.C. 154(b) by 278 days.

(21) Appl. No.: 16/157,649

(22) Filed: Oct. 11, 2018

(65) Prior Publication Data

US 2020/0117761 A1    Apr. 16, 2020

(51) Int. Cl.
*G06F 16/901* (2019.01)
*H04L 43/0811* (2022.01)
(Continued)

(52) U.S. Cl.
CPC ...... *G06F 16/9024* (2019.01); *H04L 43/0811* (2013.01); *H04L 63/083* (2013.01)

(58) Field of Classification Search
CPC ............ G06F 16/9024; H04L 43/0811; H04L 63/083; H04N 21/4627; H04N 21/6334;
(Continued)

(56) References Cited

U.S. PATENT DOCUMENTS 6,025,837 A  2/2000 Matthews, III et al.
7,302,430 B1  11/2007 Nagda et al.
(Continued)

FOREIGN PATENT DOCUMENTS

EP   0 848 554 A2   6/1998
WO    97/13368 A1   4/1997
(Continued)

OTHER PUBLICATIONS

Final Office Action received for U.S. Appl. No. 15/290,722 dated Feb. 25, 2019, 33 pages.
(Continued)

*Primary Examiner* — Robert W Beausoliel, Jr.
*Assistant Examiner* — Mohammad S Bhuyan
(74) *Attorney, Agent, or Firm* — Amin, Turocy & Watson, LLP

(57) ABSTRACT

The described technology is directed towards evaluating client-specific information and possibly other information to determine whether to return less data than is available for a data item in response to a request for graph node data to a data service, and/or return expanded graph node data. When a request for graph data is received, client-specific information is used at least in part by a data service in determining whether to return a virtual graph node comprising a relatively lightweight set of information relative to the full set of information maintained in a main (graph) node. The client-specific information is also used in determining whether to return expanded data beyond that requested, e.g., for caching at the client in anticipation of it likely being needed by the client.

20 Claims, 13 Drawing Sheets

(51) Int. Cl.
*H04L 9/40* (2022.01)
*H04N 21/4627* (2011.01)
*H04N 21/6334* (2011.01)
*H04N 21/81* (2011.01)
*H04N 21/462* (2011.01)
*H04N 21/4335* (2011.01)

(58) Field of Classification Search
CPC ............... H04N 21/81; H04N 21/462; H04N 21/4335
See application file for complete search history.

(56) References Cited

U.S. PATENT DOCUMENTS

| | | | |
|---|---|---|---|
| 7,373,459 B2 | 5/2008 | Aoki et al. | |
| 7,383,535 B1 | 6/2008 | Kshetrapal et al. | |
| 7,620,653 B1 | 11/2009 | Swartz | |
| 7,689,723 B1 | 3/2010 | DiMambro | |
| 7,769,805 B1 | 8/2010 | Barnes et al. | |
| 7,793,206 B2 | 9/2010 | Lim et al. | |
| 7,978,631 B1 | 7/2011 | Abdelaziz et al. | |
| 8,725,849 B1 | 5/2014 | Lloyd | |
| 8,849,825 B1 | 9/2014 | McHugh et al. | |
| 8,949,161 B2 | 2/2015 | Borst et al. | |
| 8,990,869 B2 | 3/2015 | Hasek | |
| 9,031,995 B1 | 5/2015 | Raden, II et al. | |
| 9,166,862 B1 | 10/2015 | Davis et al. | |
| 9,189,220 B2 | 11/2015 | Gill et al. | |
| 9,294,796 B2 | 3/2016 | McDonough et al. | |
| 9,419,852 B1 | 8/2016 | Heller et al. | |
| 9,454,356 B2 | 9/2016 | Qin | |
| 9,667,515 B1 | 5/2017 | Thimsen et al. | |
| 9,710,247 B2 | 7/2017 | Conlan et al. | |
| 9,747,382 B1* | 8/2017 | Warman ............... G06F 16/907 | |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2 | 2/2018 | Pearl et al. | |
| 9,928,308 B1 | 3/2018 | Tsun et al. | |
| 10,028,011 B2 | 7/2018 | Yao et al. | |
| 10,042,626 B2 | 8/2018 | Nekrestyanov et al. | |
| 10,148,762 B2 | 12/2018 | Rogers et al. | |
| 10,277,704 B2 | 4/2019 | Busayarat et al. | |
| 10,191,954 B1 | 6/2019 | Corley et al. | |
| 10,320,879 B2 | 6/2019 | Nekrestyanov et al. | |
| 10,884,589 B2* | 1/2021 | Pike ....................... G06Q 50/01 | |
| 10,949,191 B2 | 3/2021 | Chen | |
| 2001/0034771 A1 | 10/2001 | Hutsch et al. | |
| 2002/0143591 A1 | 10/2002 | Connelly | |
| 2003/0037206 A1 | 2/2003 | Benfield et al. | |
| 2003/0038836 A1 | 2/2003 | Ronald et al. | |
| 2003/0039230 A1 | 2/2003 | Ostman et al. | |
| 2003/0097357 A1 | 5/2003 | Ferrari et al. | |
| 2003/0191753 A1* | 10/2003 | Hoch ................... G11B 27/105 | |
| 2004/0082352 A1 | 4/2004 | Keating et al. | |
| 2004/0098744 A1 | 5/2004 | Gutta | |
| 2004/0128618 A1 | 7/2004 | Datta | |
| 2004/0139480 A1 | 7/2004 | Delpuch et al. | |
| 2005/0027871 A1 | 2/2005 | Bradley et al. | |
| 2005/0289168 A1 | 12/2005 | Green et al. | |
| 2006/0026655 A1 | 2/2006 | Perez | |
| 2006/0236221 A1 | 10/2006 | McCausland et al. | |
| 2007/0130163 A1 | 6/2007 | Perez et al. | |
| 2008/0040683 A1 | 2/2008 | Walsh | |
| 2008/0186276 A1 | 8/2008 | Mayer-Ullmann | |
| 2009/0125809 A1 | 5/2009 | Trapani et al. | |
| 2009/0138441 A1 | 5/2009 | Valentine et al. | |
| 2009/0164414 A1 | 6/2009 | Tatzel et al. | |
| 2009/0193044 A1 | 7/2009 | Buehrer et al. | |
| 2009/0210868 A1 | 8/2009 | Parthasarathy | |
| 2009/0282432 A1 | 11/2009 | Hahnefeld et al. | |
| 2010/0058390 A1 | 3/2010 | Harris et al. | |
| 2010/0063878 A1 | 3/2010 | Bachet et al. | |
| 2010/0070447 A1 | 3/2010 | Pfuntner et al. | |
| 2010/0229045 A1 | 9/2010 | Schultz et al. | |
| 2010/0257204 A1 | 10/2010 | Orlov et al. | |
| 2011/0099277 A1 | 4/2011 | Yao et al. | |
| 2011/0145327 A1 | 6/2011 | Stewart | |
| 2011/0184899 A1 | 7/2011 | Gadanho et al. | |
| 2011/0239243 A1 | 9/2011 | Dierks et al. | |
| 2011/0246471 A1 | 10/2011 | Rakib | |
| 2011/0289458 A1 | 11/2011 | Yu et al. | |
| 2011/0289533 A1 | 11/2011 | White et al. | |
| 2011/0314326 A1 | 12/2011 | Mahajan et al. | |
| 2012/0174158 A1 | 7/2012 | Mowrey et al. | |
| 2012/0197908 A1 | 8/2012 | Unno | |
| 2012/0215684 A1 | 8/2012 | Kidron | |
| 2013/0024851 A1 | 1/2013 | Firman et al. | |
| 2013/0031204 A1 | 1/2013 | Graham et al. | |
| 2013/0046849 A1 | 2/2013 | Wolf et al. | |
| 2013/0124309 A1 | 5/2013 | Traasdahl et al. | |
| 2013/0346539 A1 | 12/2013 | Sivasubramanian et al. | |
| 2013/0347018 A1 | 12/2013 | Limp et al. | |
| 2014/0006951 A1 | 1/2014 | Hunter | |
| 2014/0040301 A1 | 2/2014 | Chadha et al. | |
| 2014/0047073 A1 | 2/2014 | Berne | |
| 2014/0181137 A1 | 6/2014 | Stein | |
| 2014/0201802 A1 | 7/2014 | Boss et al. | |
| 2014/0223099 A1 | 8/2014 | Kidron | |
| 2014/0223303 A1 | 8/2014 | Cox et al. | |
| 2014/0280108 A1* | 9/2014 | Dunn ..................... G06F 16/335 | |
| | | | 707/728 |
| 2014/0344663 A1* | 11/2014 | Joel ........................ H04L 67/42 | |
| | | | 715/234 |
| 2015/0026238 A1 | 1/2015 | Natarajan | |
| 2015/0051749 A1 | 2/2015 | Hancock et al. | |
| 2015/0149544 A1 | 5/2015 | Zhang | |
| 2015/0195621 A1 | 7/2015 | Harron et al. | |
| 2015/0201001 A1* | 7/2015 | Cabanillas .......... H04L 65/4084 | |
| | | | 709/203 |
| 2015/0201033 A1 | 7/2015 | Gupta | |
| 2015/0220326 A1 | 8/2015 | Jia | |
| 2015/0235275 A1 | 8/2015 | Shah et al. | |
| 2015/0256903 A1 | 9/2015 | Walker | |
| 2015/0269146 A1 | 9/2015 | Ayyar et al. | |
| 2015/0277710 A1 | 10/2015 | Lee et al. | |
| 2015/0278219 A1 | 10/2015 | Phipps | |
| 2015/0358818 A1 | 12/2015 | Dipaola | |
| 2015/0378685 A1 | 12/2015 | Kaplinger et al. | |
| 2016/0006645 A1* | 1/2016 | Rave ................... H04L 12/2854 | |
| | | | 709/203 |
| 2016/0070447 A1 | 3/2016 | Righter et al. | |
| 2016/0085772 A1 | 3/2016 | Vermeulen et al. | |
| 2016/0086260 A1 | 3/2016 | Vermeulen et al. | |
| 2016/0105710 A1 | 4/2016 | Watson et al. | |
| 2016/0110412 A1* | 4/2016 | Sun ....................... G06F 16/248 | |
| | | | 707/769 |
| 2016/0140002 A1 | 5/2016 | Fee et al. | |
| 2016/0191985 A1 | 6/2016 | Tirpak | |
| 2016/0205428 A1 | 7/2016 | McDonough et al. | |
| 2016/0267523 A1 | 9/2016 | Biswas et al. | |
| 2016/0328485 A1* | 11/2016 | Dodonov ............. G06F 16/9574 | |
| 2016/0337426 A1 | 11/2016 | Shribman et al. | |
| 2016/0371750 A1* | 12/2016 | Peddinti ............. G06Q 30/0277 | |
| 2017/0006036 A1 | 1/2017 | Bellingham | |
| 2017/0032005 A1 | 2/2017 | Zheng et al. | |
| 2017/0041296 A1 | 2/2017 | Ford et al. | |
| 2017/0083941 A1 | 3/2017 | Biswas et al. | |
| 2017/0103553 A1 | 4/2017 | Busayarat et al. | |
| 2017/0104838 A1 | 4/2017 | Busayarat et al. | |
| 2017/0104842 A1* | 4/2017 | Busayarat ........... H04L 67/2833 | |
| 2017/0105049 A1* | 4/2017 | Busayarat ............... H04L 67/28 | |
| 2017/0177333 A1 | 6/2017 | Busayarat et al. | |
| 2017/0214764 A1* | 7/2017 | Bakshi .................... G06N 20/00 | |
| 2017/0323028 A1 | 11/2017 | Jonker et al. | |
| 2017/0353577 A1 | 12/2017 | Lutz et al. | |
| 2018/0039647 A1* | 2/2018 | Winstanley .......... G06F 16/9535 | |
| 2018/0060248 A1 | 3/2018 | Liu et al. | |
| 2018/0131633 A1 | 5/2018 | Li | |

(56) References Cited

U.S. PATENT DOCUMENTS

| | | | |
|---|---|---|---|
| 2018/0183891 A1* | 6/2018 | Zhang | H04L 67/125 |
| 2019/0095395 A1 | 3/2019 | Piecko | |

FOREIGN PATENT DOCUMENTS

| | | |
|---|---|---|
| WO | 2007/054687 A1 | 5/2007 |
| WO | 2011/102824 A2 | 8/2011 |
| WO | 2017004138 A1 | 1/2017 |

OTHER PUBLICATIONS

Communication pursuant to Article 94(3) EPC received for EP Patent Application Serial No. 16787677.0 dated Mar. 13, 2019, 8 pages.

Non-Final Office Action received for U.S. Appl. No. 15/584,142 dated Apr. 29, 2019, 144 pages.

Notice of Allowance received for U.S. Appl. No. 15/584,142 dated Feb. 21, 2020, 30 pages.

Non-Final Office Action received for U.S. Appl. No. 16/290,224 dated Apr. 22, 2020, 87 pages.

Non-Final Office Action received for U.S. Appl. No. 15/290,722 dated Sep. 9, 2019, 23 pages.

Non-Final Office Action received for U.S. Appl. No. 15/285,439 dated Jul. 25, 2019, 39 pages.

Second Office Action received for Colombian Application Serial No. NC2018/0005094 dated Jul. 4, 2019, 30 pages (with English translation).

Notice of Allowance received for U.S. Appl. No. 16/054,278 dated Dec. 18, 2019, 58 pages.

Final Office Action received for U.S. Appl. No. 15/584,142 dated Nov. 6, 2019, 155 pages.

International Search Report and Written Opinion for International Application Serial No. PCT/US2019/055851 dated Nov. 22, 2019, 13 pages.

Summons to attend oral proceedings pursuant to Rule 115(1) EPC received for EP Application Serial No. 16787677.0 dated Dec. 6, 2019, 7 pages.

International Search Report and Written Opinion received for International Application Serial No. PCT/US2016/056755 dated Dec. 19, 2016, 15 pages.

Non-Final Office Action received for U.S. Appl. No. 15/285,439 dated Jul. 27, 2017, 27 pages.

Notice of Allowance received for U.S. Appl. No. 15/252,166 dated Mar. 22, 2018, 40 pages.

Final Office Action received for U.S. Appl. No. 15/285,439 dated Feb. 2, 2018, 23 pages.

El-Ansary, et al., "An Overview of Structured P2P Overiay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.

Non-Final Office Action received for U.S. Appl. No. 15/291,247 dated Jun. 14, 2018, 70 pages.

Non-Final Office Action received for U.S. Appl. No. 15/290,722 dated Jun. 28, 2018, 29 pages.

Office Action received for Colombian Patent Application Serial No. NC2018/0005094 dated Aug. 22, 2018, 3 pages (including English translation).

Non-Final Office Action received for U.S. Appl. No. 15/285,439 dated Jul. 25, 2018, 32 pages.

European Office Action received for EP Patent Application Serial No. 16787677.0 dated May 30, 2018, 3 pages.

Office Action received for Chinese Patent Application Serial No. 201690001472.1 dated Aug. 17, 2018, 2 pages.

Non-Final Office Action received for U.S. Appl. No. 15/291,810 dated Nov. 19, 2018, 43 pages.

Final Office Action received for U.S. Appl. No. 15/285,439 dated Jan. 30, 2019, 41 pages.

International Search Report and Written Opinion for International Application Serial No. PCT/US2018/030717 dated Aug. 7, 2018, 16 pages.

Non-Final Office Action received for U.S. Appl. No. 16/561,572 dated Sep. 23, 2020, 45 pages.

Decision to refuse a European Patent application received for European Patent Application Serial No. 16787677.0 dated Jul. 22, 2020, 26 pages.

Final Office Action received for U.S. Appl. No. 16/290,224 dated Oct. 21, 2020, 40 pages.

Non-Final Office Action received for U.S. Appl. No. 15/449,229 dated Jun. 28, 2019, 52 pages.

Notice of Allowance for U.S. Appl. No. 15/291,810 dated Apr. 22, 2019, 22 pages.

Non-Final Office Action received for U.S. Appl. No. 16/818,109 dated Apr. 23, 2021, 85 pages.

Stack Overflow, What does ii mean to hydrate an object?, Aug. 9, 2011 and Dec. 23, 2013, https://stackoverflow.com/questions/6991135/what-does-it-mean-to-hydrate-an-objecl/20787106#20787106, Accessed Apr. 14, 2021, 5 pages.

International Preliminary Report on Patentability received for PCT application No. PCT/US2019/055851 dated Apr. 22, 2021, 8 pages.

Non-Final Office Action received for U.S. Appl. No. 16/854,135 dated Jan. 6, 2022, 59 pages.

Non-Final Office Action received for U.S. Appl. No. 16/889,149 dated Jan. 19, 2022, 56 pages.

Final Office Action received for U.S. Appl. No. 16/818,109 dated Oct. 15, 2021, 56 pages.

Non-Final Office Action received for U.S. Appl. No. 16/889,129 dated Nov. 23, 2021, 81 pages.

Non-Final Office Action received for U.S. Appl. No. 16/818,109 dated Jul. 7, 2022, 64 pages.

Mexican Office Action for Mexican Application Serial No. MX/a/2018/004690 dated Jul. 14, 2022, 6 pages.

Notice of Allowance received for U.S. Appl. No. 16/889,149 dated Sep. 29, 2022, 41 pages.

Final Office Action received for U.S. Appl. No. 16/854,135 dated Sep. 2, 2022, 41 pages.

Office Action received for Mexican Patent Application Serial No. MX/a/2018/004690 dated Oct. 11, 2022, 11 pages (Original Copy).

Final Office Action received for U.S. Appl. No. 16/818,109 dated Dec. 7, 2022, 76 pages.

Office Action received for Canadian Patent Application Serial No. 3002055 dated Nov. 23, 2022, 4 pages.

EP Office Action for EP Application Serial No. 19795414.2 dated Jan. 12, 2023.

* cited by examiner

GRAPH VIEWS TO IMPROVE USER INTERFACE RESPONSIVENESS

BACKGROUND

Client users interact with information via user interfaces, such as menus of data items (e.g., buttons, tiles, icons and/or text) by which a client user may make a desired selection. For example, a client user may view a scrollable menu containing data items representing video content, such as movies or television shows, and interact with the menu items to select a movie or television show for viewing.

A significant amount of information may be made available to client users. For example, with respect to a video such as a movie, in addition to the movie's title, a movie's associated data may include a rating, one or more images that represent the movie, a plot summary, cast and crew information, other credits and so on, which users often wish to have. When dealing with large numbers of data items, it can take a long time for a client to download and process the information.

The amount of time to download the information to the client and process the information at the client can be undesirable, particularly when the information is downloaded via relatively low bandwidth connections, and/or processed by relatively low-powered client devices. At the same time, some client devices can be high-powered devices and/or with relatively high bandwidth connections.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards receiving a request for graph node data from a client device, in which the graph node data are identified by one or more data identifiers. Aspects include accessing client-specific information associated with the client device and determining from the client-specific information whether a response to the request is to comprise modified graph node data that does not directly correspond to the requested graph node data, and if so, returning a response to the request that comprises modified graph node data that does not directly correspond to the requested graph node data Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
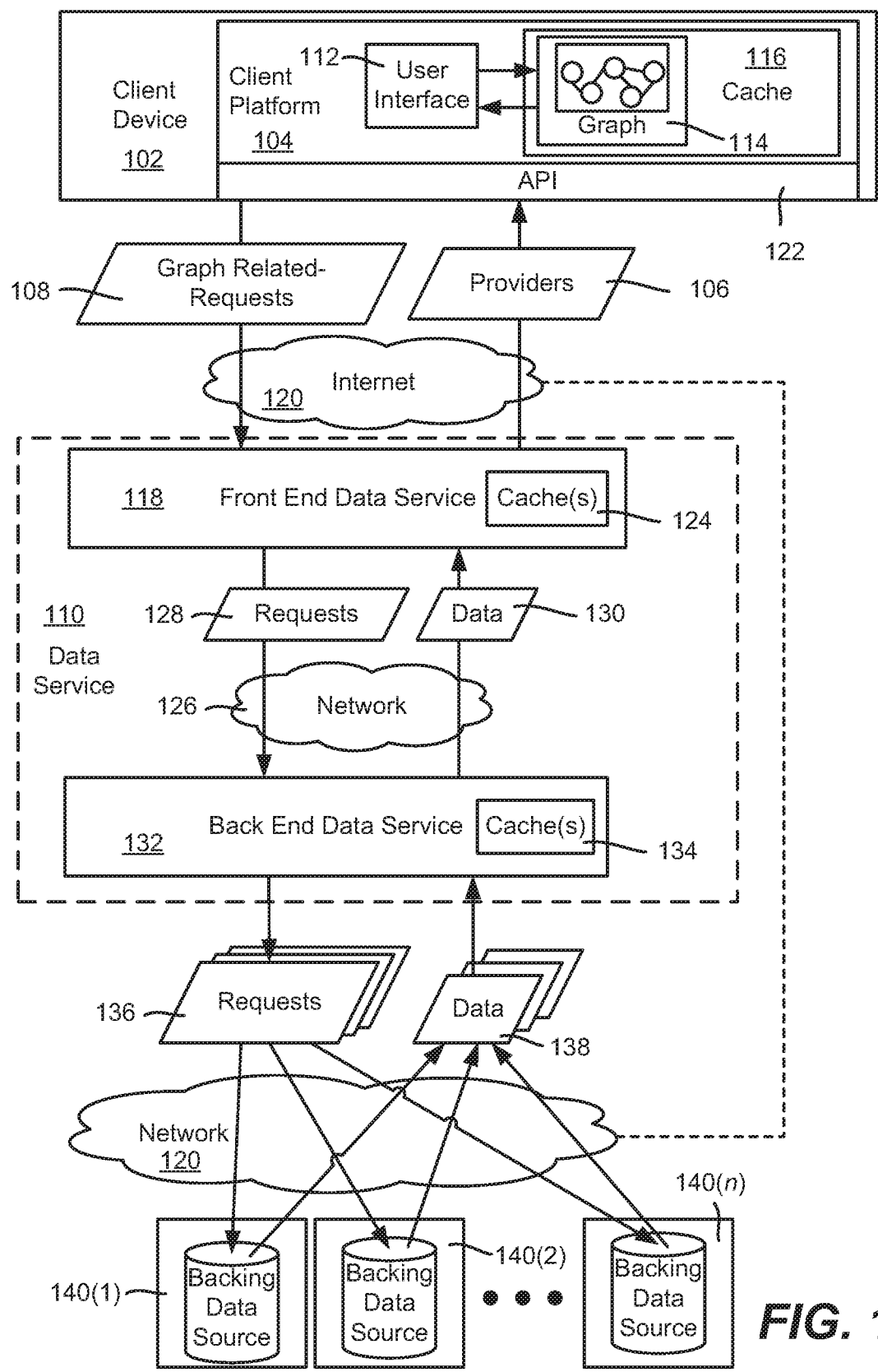
FIG. 1 is an example block diagram representation of a client device communicating with a data service to obtain data comprising one or more main graph nodes, virtual graph nodes and/or expanded graph nodes, according to one or more example implementations.

Various aspects of the technology described herein are generally directed towards assessing a client device's needs and capabilities with respect to user interface elements, and intelligently downloading user interface element data from a data service to the client device based upon the assessment. The user interface element data can be arranged as a graph of nodes at the data service, with relevant nodes (or parts thereof as described herein) downloaded to the client device as needed to render a client-side user interface, such as a menu of interactive elements.

In one or more implementations, generally fixed client device factors such as client device cache size and screen size can be used with respect to what parts/nodes of the graph to download. More dynamic factors such as connection bandwidth/latency, retries based on errors and/or timeouts, client connection information (e.g., data plan factors) and so on can also be evaluated with respect to selecting data to download to a client. Still further, per-client (or group) data, such as known client preferences and recommendations for that client, can be used as factors in determining what amount of data to download to a client.

In one aspect, when selecting the data to download to a client, only part of the graph view node data, e.g., the part that is needed for user interface rendering, can be downloaded (e.g., as a virtual node as described herein) in response to a client request, which reduces the amount of data downloaded with respect to a requested user interface item. Downloading reduced graph node data is described in U.S. patent application Ser. No. 15/584,142, filed May 2, 2017, entitled "VIRTUAL GRAPH NODES" and is hereby incorporated by reference herein in its entirety. In another aspect, a response to a client request for graph view node data can also include expanded graph data that the data service expects that particular client will likely need, allowing the data service and client to reduce round-trip calls and ultimately reduce the time it takes for the client application to receive the data it will need to render the user interface. Downloading expanded graph node(s) is described in U.S. published patent application no. US20170105049A1, filed Oct. 4, 2016, entitled "RESOURCE RESPONSE EXPANSION" and is hereby incorporated by reference herein in its entirety.

The technologies and approaches of virtual graph nodes and expanded graph nodes can be used in conjunction with one another, as well as batching and ETag (entity tag) headers, which ensure a responsive user interface by optimizing the data coming into the client. In addition to shaping the structure of the graph to match the layout and design of a given application, virtual graph nodes can be used so that the specific metadata on each node more precisely matches what the client application needs to render the user interface, while reducing or eliminating additional metadata that would be communicated and processed but ultimately (likely) would be unused. A response to a client request for node data can also include expanded data that the data service expects that particular client will likely need, in addition to the data that was specifically requested, allowing the data service and client to reduce round-trip calls and ultimately reduce the time it takes for the client application to receive the data it needs to render the user interface.

A client requests a set of graph nodes that (in general) each represent a user interface element. For example, a graph node representing a movie can contain the title, rating, a reference (URL) to one or more representative images, cast and crew data, plot summary data, and so on; the client application uses the node's data to render an interactive tile or the like on a user interface. Much of the information in a node is not needed for rendering a tile that visually represents the movie graph node, and is only useful if and when the user further interacts with that tile. Given that numerous tiles can be downloaded at a time, such as ten movie tiles at a time for a movie menu, significant data downloading can be saved by downloading only the subset of the graph node data that a tile actually needs for rendering in a menu, in what is referred to as a virtual graph node. However, a particular client device may receive a main (full) graph node in certain circumstances, such as if the client user is known to likely interact with a particular tile.

At the same time, one or more expanded graph nodes (which can be main graph nodes or virtual graph nodes) can be downloaded in advance of what is likely to be needed at a client device. For example, consider that a user who downloads a menu for "Popular Shows" is (based on statistics or other observations) very likely to next select the "Game of Thrones" sub-menu. Thus, when the user interacts to select the "Popular Shows" menu, the user may be given that menu and its interactive tiles, plus the "Game of Thrones" sub-menu node along with some number of "Game of Thrones" nodes or virtual nodes, returned in the same response. Because these expanded graph nodes (which can be virtual graph nodes or main graph nodes) are cached in anticipation of their actual need, the responsiveness (should the user select such a node as anticipated by the data service) is perceived to be almost immediate.

In general, the data for a user interface (UI) may be structured in various ways that maintain relationships between the UI elements, such as a hierarchy or graph of data items. In one or more implementations exemplified herein for purposes of explanation, the data is maintained in graph nodes (providers) based upon a client graph. Thus, for example, a menu object may request a set of tile objects to render within the display of the menu; the menu object may correspond to one provider in the graph, and the tiles may correspond to other, child providers; e.g., each tile corresponds to a provider that holds the data for that tile. Edges relate (at least) the menu provider to the tile providers.

In general, a graph of providers is built by each client of the data service, in which a provider represents a part of the overall underlying data that is available via a data service; (as used herein a "graph" is formed by the relationships between providers or provider data structures, regardless of whether visibly represented as nodes and edges). The set of providers for a given client includes a subset of the available data service's data that are currently relevant to that client, e.g., those which the client user interface displays. The edges between nodes model the relationships between the various providers.

To build the client graph, in addition to the data properties/attributes maintained in a provider, a provider's data also may include edge references to other providers, as well as possibly more specific relationship information, e.g., indicative of a child or parent relationship to another provider. The client platform software follows these references to obtain more providers as needed. For example, if a provider A, such as representing a menu, references two child providers B and C, then when provider A is to be rendered as a user interface menu object, the data is obtained for providers B and C so that they can be rendered as part of the A menu, and so on. If a client interacts to select item B, e.g., a sub-menu object of menu A, then the provider data for sub-menu B including B's referenced providers are requested and obtained so that menu object B can be rendered.

Once obtained, providers may be cached at the client so that they may be quickly accessed from the client cache rather that obtained via another (e.g., internet) request to the data service. As described herein, one or more providers may be returned from the data service in an expanded response, in anticipation of their likely being needed rather than waiting for an actual need, with those expanded providers cached by the client.

In general, providers have an identifier (ID) that is unique to the data service, and indeed may be globally unique, such as a Uniform Resource Name (URN); (e.g., urn:hbo:menu:root). Providers are typed, (note that in one scheme, the type of provider also may be determined from its URN) and each provider implements a model with a model interface that defines the schema/shape of the provider's data. For example, with respect to video content, there may be a provider of type "feature" that represents some available streaming video content and includes a title, a URL to an image, a rating (if known), and so forth. As another example, a provider of type "user" may represent a client user, and may have per-user data such as a username, parental controls (such as maximum rating allowed), a "watch-list" of user-specified (and/or for example machine learned) shows of particular interest or the like, and so forth. Via the user provider, different per-user portions of graph data may be associated with different client users.

Thus, based upon user interaction as well as automated processes, using the graph providers' relationships, a client software platform makes requests for one or more providers to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from backing data sources. In this way the client software builds relevant portion(s) of the graph as needed, which in general is highly efficient with respect to resource usage and obtaining rapid responses. Note that providers may be cached at the client as described herein, and thus each time data is needed the client platform may first attempt to use cached data without making a request to the request handling portion of the data service. Expansion as described herein pre-populates the client cache with data items (e.g., providers) that related to requested data items.

FIG. 1 is a block diagram representing example components that may be used to handle client requests for data items, exemplified as providers (graph nodes from a data service), based upon a client graph. As exemplified in FIG. 1, a client device 102 runs client platform software 104 that receives providers 106, including via graph-related requests 108, from a data service 110. Note that the client device 102 initially may receive one or more starting providers corresponding to typed nodes automatically, e.g., when the client user of the client device 102 authenticates with the data service 110. For example, when the user logs in on the client device 102, the client device 102 may receive a user provider, a root provider and so forth that the client platform software 104 expects upon successful authentication. In this way, the client platform 104 may present initial user interface elements by rendering a root menu or the like based upon the root provider, such as a home/root menu, with buttons, icons, tiles and so forth by which a user can navigate to other locations. Note that because in one or more implementations the root provider is the starting point for an interactive user interface 112, in addition to the root provider one or more providers referenced by the root provider may be automatically communicated to the client in advance. Note however that this is only one possible optimization, and alternatively the client device may be configured to make requests for any needed data, including the root provider at start up, as well as providers that are children of the root provider, and so on.

In one or more implementations, the client software program's UI elements or the like may make requests for data items to the client platform (e.g., at a data service level) without needing to know about providers or how the underlying data is maintained, organized, retrieved and so forth. For example, a tile object that represents a television show may in a straightforward manner send a request to the client platform software for a title corresponding to a title ID (which in one or more implementations is also the provider ID), and gets the title back. As will be understood, beneath the UI level, the client platform software obtains the title from a (feature type) provider corresponding to that ID; the provider data may be obtained from a client cache, but if not cached, by requesting the provider from a data service, as described herein.

As set forth above, each provider may reference one or more other providers, which forms a graph 114 (e.g., generally maintained in a client cache 116 or other suitable data storage). The client graph 114 is built by obtaining the data for these other providers as needed, such as when providers are rendered as visible representations of objects on the interactive user interface 112. Example visible representations of provider data may include menus, tiles, icons, buttons, text and so forth.

In general, the client graph 114 comprises a client-relevant subset of the overall data available from the data service 110; (the available data at the data service can be considered an overall virtual graph). Because in the client platform 104 the underlying data forms the client graph 114, at least part of which are typically represented as elements on the user interface 112, a user can interact to receive data for any relationship that the data service 110 (e.g., of the streaming video service) has decided to make available, including relationships between very different kinds of data, and/or those that to some users may seem unrelated. Over time the data service 110 can add, remove or change such references as desired, e.g., to link in new relationships based upon user feedback and/or as new providers and/or provider types become available.

To obtain the providers 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return providers 106, in a manner that is expected by the client platform software 104. The returned providers 106 may include the requested provider(s) and one or more expanded providers that were not specifically requested, as described herein. Some of the requests for a provider may correspond to multiple sub-requests that the client platform software 104 expects in a single provider; for example, a request for a tile provider that represents a feature (movie) may correspond to sub-requests for a title (in text), an image reference such as a URL, a rating, a plot summary and so on. A request for a user's "watch list" may correspond to sub-requests for multiple tiles. The data service 110 understands based upon each provider's type how to obtain and assemble data sub-parts as needed, from possibly various sources, into a single provider to respond to a client request for a provider.

The corresponding provider may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full provider (e.g., a tile corresponding to data from multiple sub-requests), but it is feasible to cache at least some data in sub-parts that are aggregated to provide a full provider. Data items that are expanded data items with respect to a requested data item may be cached.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132. The requests 128 may include requests for expanded data as described herein, with the expanded data returned among the data 130.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140(n). Non-limiting examples of such data sources 140(1)-140(n) may include key-value stores, relational databases, file servers, and so on that may maintain the data in virtually any suitable format. A client request for provider data may correspond to multiple sub-requests, and these may be to backing data sources; the data service 110 is configured to make requests for data in appropriate formats as needed to the different backing data sources 140(1)-140(n). Moreover, one data store's data may override another data store's data; e.g., the data for a television show may include a generic image URL obtained from one data store, however an "editorial"-like data store may override the generic image with a different image, such as for some uncharacteristic episode. Note that in one or more implementations, non-cache data sources 140(1)-140(n) may use a wrapper that implements a common cache interface, whereby each remote data source 140(1)-140(n) may be treated like another cache from the perspective of the back-end data service 132.

It should be noted that any requests can be batched for efficiency. For example, instead of sending individual requests for separate items, a single batched request can request multiple items (whether from a client to the front end data service 118, the front end data service 118 to the back end data service 132, and/or the back end data service 132 to a backing data source 140). Moreover, requests can be multiplexed; for example, two or more different clients can request the same item from the front end data service 118 at generally the same time, whereby the item can be requested only once from the back end data service 132, and demultiplexed into separate responses to the two or more different clients. Batching and multiplexing can be combined. ETag headers can be used to avoid resending data that is unchanged.

Figure 2:
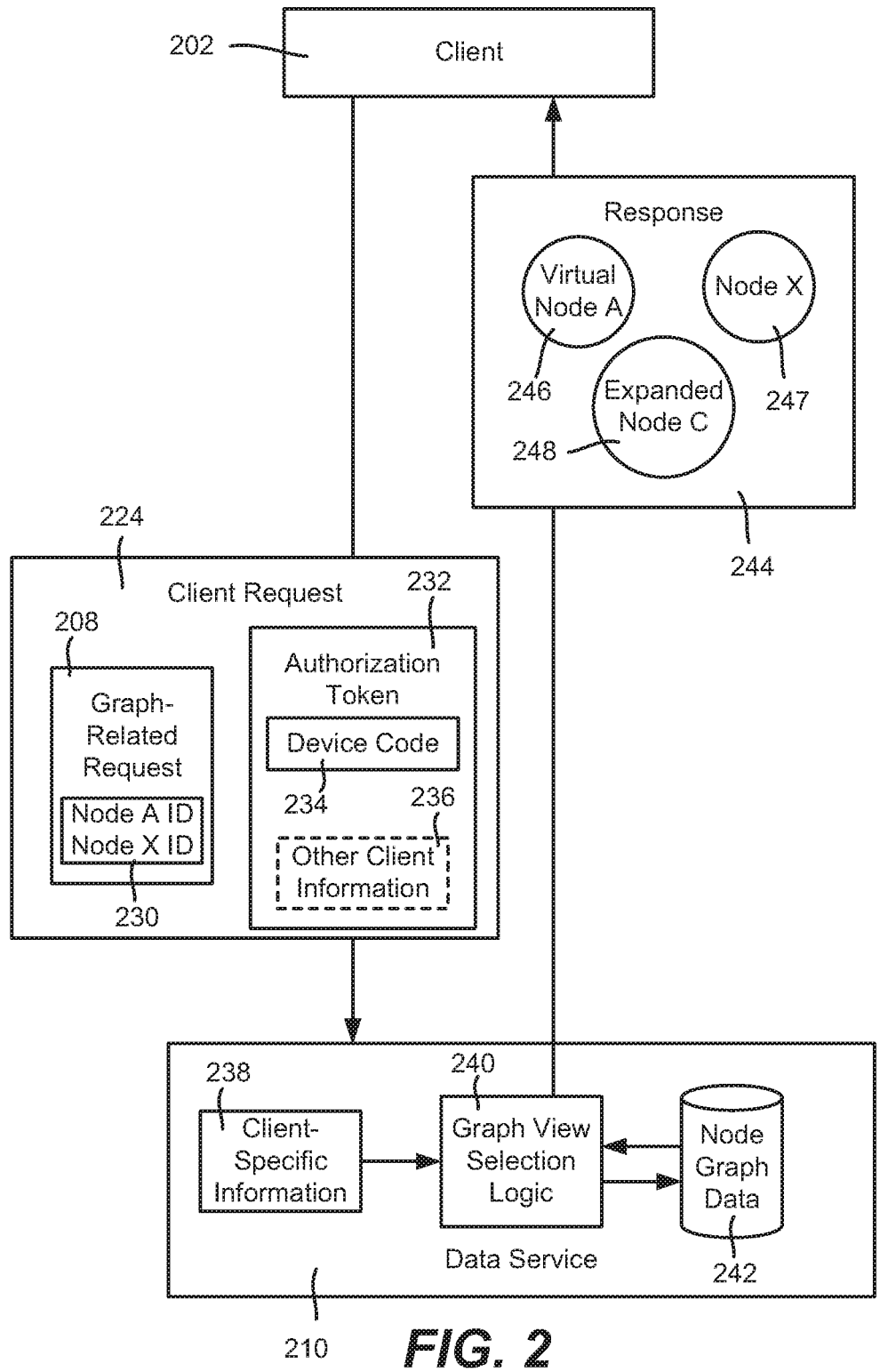
FIG. 2 is a representation of example data service components that obtain, process and return client-requested data, including main graph nodes, virtual graph nodes and/or expanded graph nodes based at least in part on client-specific information, according to one or more example implementations.

FIG. 2 exemplifies how in one or more implementations, a request 224 from a client 202 may be received by a data service 210 and processed to determine a graph view (comprising one or more main nodes or virtual nodes) to select and return. A client can also receive a partial node, e.g., the data that was not previously returned in a virtual node but is now needed at the client (it is alternatively feasible to simply return the corresponding main node if more data than was present in a virtual node is now needed by a client) As described herein, client requests include a graph-related request 208 comprising one or more object identifiers 230 such as (e.g., each identifier) in the form of a uniform resource name (URN). A client request also includes an authorization token 232, which among other purposes (e.g., authentication) may include client device-specific information (e.g., a device code 234) that indicates the type (e.g., the vendor and model as needed to differentiate from others) of the requesting client device, and/or its software version. The software version information may be part of the device code, or may be in another code (e.g., appended to a device-only code); for purposes of explanation, consider that as used herein, "device code" identifies the device and the software version information. Other client information 236 may be optionally provided, e.g., as part of the authorization token 232 (or separately), such as information as to whether the client 202 is operating on a wired internet connection, on Wi-Fi, over cellular with an unlimited data plan or one that is metered (possibly along with data budget information) and so on.

The data service 210 receives the request, and saves the received information as client-specific information 238 in conjunction with a client-identifier or the like. Note that the client-specific information 238 may not be saved exactly and entirely as provided by the client, but rather can include information used to determine how to select, format and shape information for the response. For example, consider that the client has a relatively small cache; information such as one or more weighted scores corresponding to "send virtual nodes, and no more than one expanded node" can be determined once and associated with the client ID, and thereafter need not be recomputed when responding to further requests from that client, unless or until something changes (e.g., the client is now connected via Wi-Fi instead of cellular).

As described herein, based at least in part on the client-specific information 238, graph view selection logic 240 (e.g., a component of the data service 210) determines what graph node data/data items of the graph to return, e.g., main graph nodes, virtual graph nodes and/or expanded graph nodes (which can be main nodes or virtual graph nodes). To this end, the graph view selection logic 240 accesses the node graph data 242, and determines what nodes to return, and how to return them, e.g., as main nodes or virtual nodes. Note that the data service 210 also shapes and formats the data as expected by the client software, to handle variations among different devices and/or software versions.

In the example of FIG. 2, the client has requested two nodes via object identifiers 230, node A and node X. Based on the client specific information 238, the graph view selection logic 240 determines that node A is to be returned in a response 244 as a virtual node 246, e.g., because node A is to be rendered as a tile. The node X is to be returned as a main node 247; note that this may be because the node X is not something that makes sense to return as a virtual node. Further, the graph view selection logic 240 determines that an expanded node can be returned with the response 244. Such an expanded graph node C 248 is selected by the data service 210, e.g., because it is deemed likely by the data service 210 that the client 202 will be requesting that node 248 in a future request, so that node 248 may as well be returned now for caching at the client 202. The expanded node C 248 can be returned as a virtual node or as a main node.

For example, a device with a small cache and slow network connection may not get many (and possibly zero) expanded nodes per request response, and one or more of the nodes requested may be returned as virtual nodes even if not requested as such. In contrast, a device with a relatively large cache size and high bandwidth connection may get the requested nodes as well as a relatively large number of such expanded nodes; one or more of the requested nodes or expanded nodes may or may not be virtual nodes instead of main nodes. A large cache may even be filled to some extent by automatically generated background requests. As another example, a user who has not ever and is likely to never stream a "Game of Thrones" episode may get a different set of expanded nodes when requesting the "Popular Shows" menu. This may be determined based upon historical data and/or user profile data (such as age or other demographics).

Figure 3:
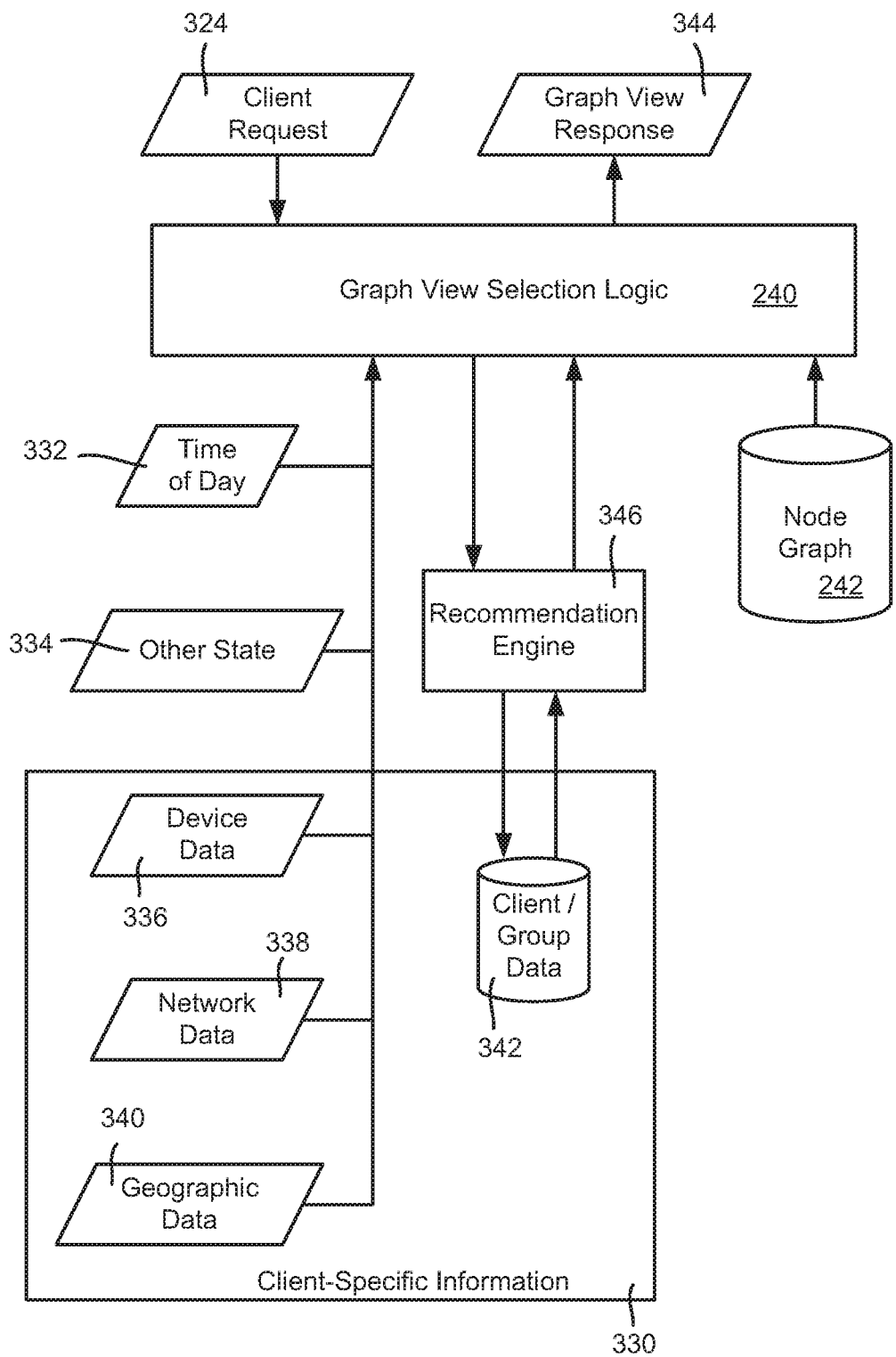
FIG. 3 is a representation of various example client-specific information and other information that can be used to select graph node data for returning in response to a client request, according to one or more example implementations.

FIG. 3 shows non-limiting examples of how graph view selection logic 240 can use client-specific information 330 along with state information such as time of day (including day of week) 332 and other state 334 (e.g., expected demand for graph-related requests based on historical data, how much load is on the data service at this time, how much load is expected shortly and so on). The client-specific information exemplified in FIG. 3 includes device data 336, network data 338, geographic data 340 (e.g., country, time zone and so on) and client/group (e.g., profile) data 342, such as the user's watchlist and favorites. Note that other client information can be retained, e.g., the client's current behavior is to repeatedly request more tiles (e.g., the client appears to be scrolling through a menu) without selecting anything, whereby returning virtual nodes is more likely efficient than returning main nodes.

In the example of FIG. 3, a client request 324 seeks some part of the graph to be returned. The graph view selection logic 240 can use any of the information it has to determine what node(s) of the graph to return in a response 344 to the request 324, including one or more main nodes, virtual nodes, partial nodes and/or expanded nodes.

By way of example, consider that a client request for some nodes representing tiles is received at the data service, e.g., because the user has interactively scrolled within a menu to a location in which more tiles need to be rendered. Instead of simply returning the requested nodes, the graph view selection logic can be invoked by the data service to evaluate the client specific information (and possibly other state) to determine what graph view to return. As a more particular example, consider that based on latency measurements (e.g., in the network data 338) it is known that the client device has a relatively slow connection. Further, the client device can be known (via its device code or the like in the device data 336) to have a relatively small cache. Thus, it is determined to return virtual nodes for the tiles instead of main nodes.

Further, although not requested, the graph view selection logic 240 can determine that an expanded node is to be returned, with the response 344 or possibly in a background operation following the response 344. This can be based on a recommendation engine 346 evaluating client or group data 342; e.g., this user (or fits into a group of users that) often requests a "Game of Thrones" menu and related tiles. The time of day/day of week can also be a factor, e.g., when it is Thursday night, the user usually streams a Game of Thrones episode. Note that the recommendation engine 346 can range from a simple rule-based engine (e.g., if request node A, then also return expanded node C) to a complex machine-learned system that evaluates user (or group) data to predict recommendation(s) as to what the user is likely to want next. Other factors can be used as well, e.g., based on history and the current time, a flood of requests from many clients will be coming in very soon, so pre-loading this client's cache will save resources.

A scoring system or the like can be used to help in the determination. For example, with respect to whether to send virtual nodes (when possible), a score for the device type can be combined with a score for the current network conditions and evaluated against a threshold value. With respect to whether to send one or more expanded nodes, and if so, how many (and whether virtual or main), a score can be computed based on device data 336, the network data 338, current server load, expected future server load, and so on. For example, a score versus a range of thresholds can correspond to how many expanded nodes to return, e.g., zero, one, or a maximum possible based on rules, as generally described below with reference to FIGS. 6 and 7.

Thus, as shown in FIGS. 2 and 3, various optimizations as described herein may be customized according to client-specific information. Such information can include, but is not limited to, per-device information, per-user preference data, per-user profile data, per-network conditions, current state information, and so forth.

Turning to additional details regarding virtual nodes, a client can explicitly request a virtual node, or the graph view selection logic 240 can elect to send a virtual node in place of a requested main node. Note that the data service 210 can override any client request, as long as the client software supports what the data service returns, e.g., the client software supports receiving virtual node(s) in place of requested main node(s) and also supports receiving non-requested expanded node(s).

Figure 4:
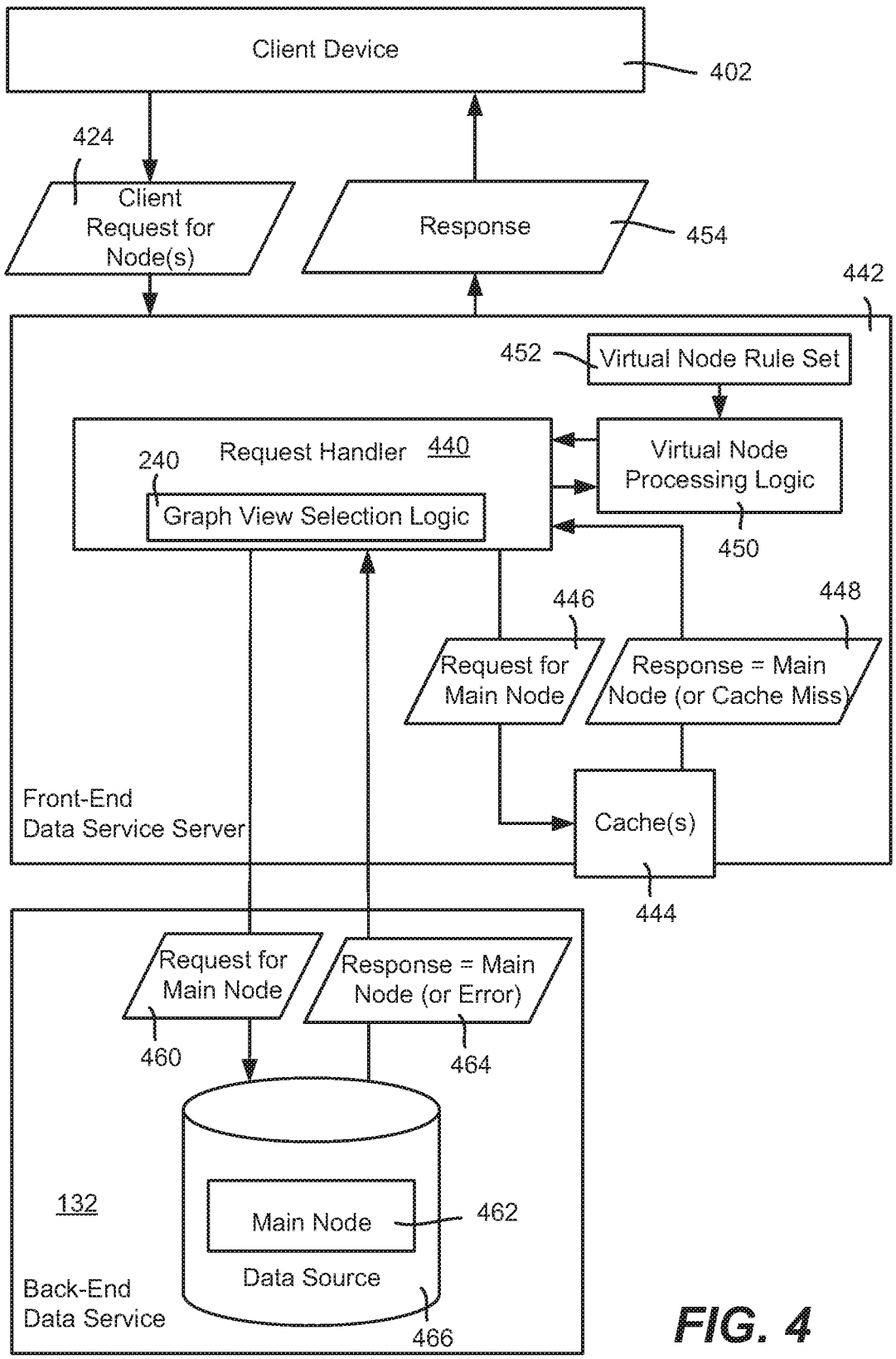
FIG. 4 is a representation of example data service components that obtain, process and return client-requested data, including virtual nodes, according to one or more example implementations.

FIG. 4 exemplifies the concept of virtual nodes, in which a client device 402 makes a request 424 for one or more node to a request handler 440 of a server 442 of the front-end data service. As set forth herein, a virtual node can be returned; for example, one kind of virtual node comprises a tile that has as its corresponding main node a feature-type node. In the example of FIGS. 2 and 3, the graph view selection logic 240 (e.g., incorporated into or coupled to the request handler 440) can change a request for a main node (e.g., encoded "type:feature") into a request for a virtual node (e.g., encoded "type:tile"), (or vice-versa).

Note that if a client requests a virtual node, e.g., a tile makes the request, the client device 402 (e.g., a request manager of the client platform software) sends the identifier, which may be generally the same for the virtual node and the main node, along with an indication that a virtual node is desired. For example, a tile virtual node may be identified as "urn:hbo:tile:GVhxAxgVh5ZRpwnAKAABm:type:tile" whereas the main node may be "urn:hbo:feature: GVhxAxgVh5ZRpwnAKAABm: type:feature" (although because the string "feature" is embedded in the URN, the encoded type information may be omitted in one or more implementations). Note that the client device 402 may make batch requests to the front end data service, and the tile virtual node request 424 may be a get request or may be part of a batch request.

In any event, in this example the request handler 440 receives the request 424 and recognizes the request (e.g., via the encoded "type:tile") as requesting a virtual node, and attempts to obtain the node data from a cache. For example, the request handler 440 looks in a front end data service cache set 444 (one or more front-end caches, which for example may be accessed via a request 446 to a cache framework library) for the virtual node, and if not found, for the main node. Note that in alternative implementations, it is feasible for the front-end data service/front-end servers to only cache main nodes, rather than caching both virtual nodes and main nodes.

If the virtual node is cached and valid, it is returned in a cache response 448; else if not cached and the main node is cached and valid, the request handler 440 invokes virtual node processing logic 450. Note that if the graph view selection logic 240 has already processed any main node request into a virtual node request as desired according to the client-specific information, at this stage any main node request that remains as such need not be processed into a virtual node. However, it is alternatively feasible to have the graph view selection logic 240 operate at this stage (instead of converting the main node request into a virtual node request) to identify which main node(s) are to be converted to virtual node(s) before returning in the response 454.

The virtual node processing logic 450 processes the main node into a virtual node, e.g., by accessing a rule set 452 that specifies removing or otherwise modifying certain data as described herein, such as by applying a rule set. The request handler 440 thus returns the virtual node in a response 454 to the client device.

If a cache miss is returned in the response 448, the request handler 440 makes a request 460 for the main node 462 to the back-end data service 132, which returns a response 464 comprising the main node 462 from a data source 466 (e.g., from one of the back-end caches 134 in FIG. 1 or the one or more backing data sources 140(1)-140(n); the back-end service also may return an error). Note that in one or more implementations the back-end service only deals with main nodes. Typically the main node is returned (and not an error) from the back end service 132, and the virtual node processing logic 450 is invoked to process the main node data in the response 464 into the virtual node for returning in the response 454 as described herein. The virtual node may be cached at the front end server and/or the client cache.

Once obtained and returned to the front end data service server, the main node also may be cached at the front-end data service cache set (e.g., written through to the relevant in-memory server cache and the shared cache). In this way, if the client device 402 requests the main node, or another client requests the main node or its corresponding virtual node, the data is already available (until expired) at the front-end service cache set 444 for rapid retrieval.

Figure 5:
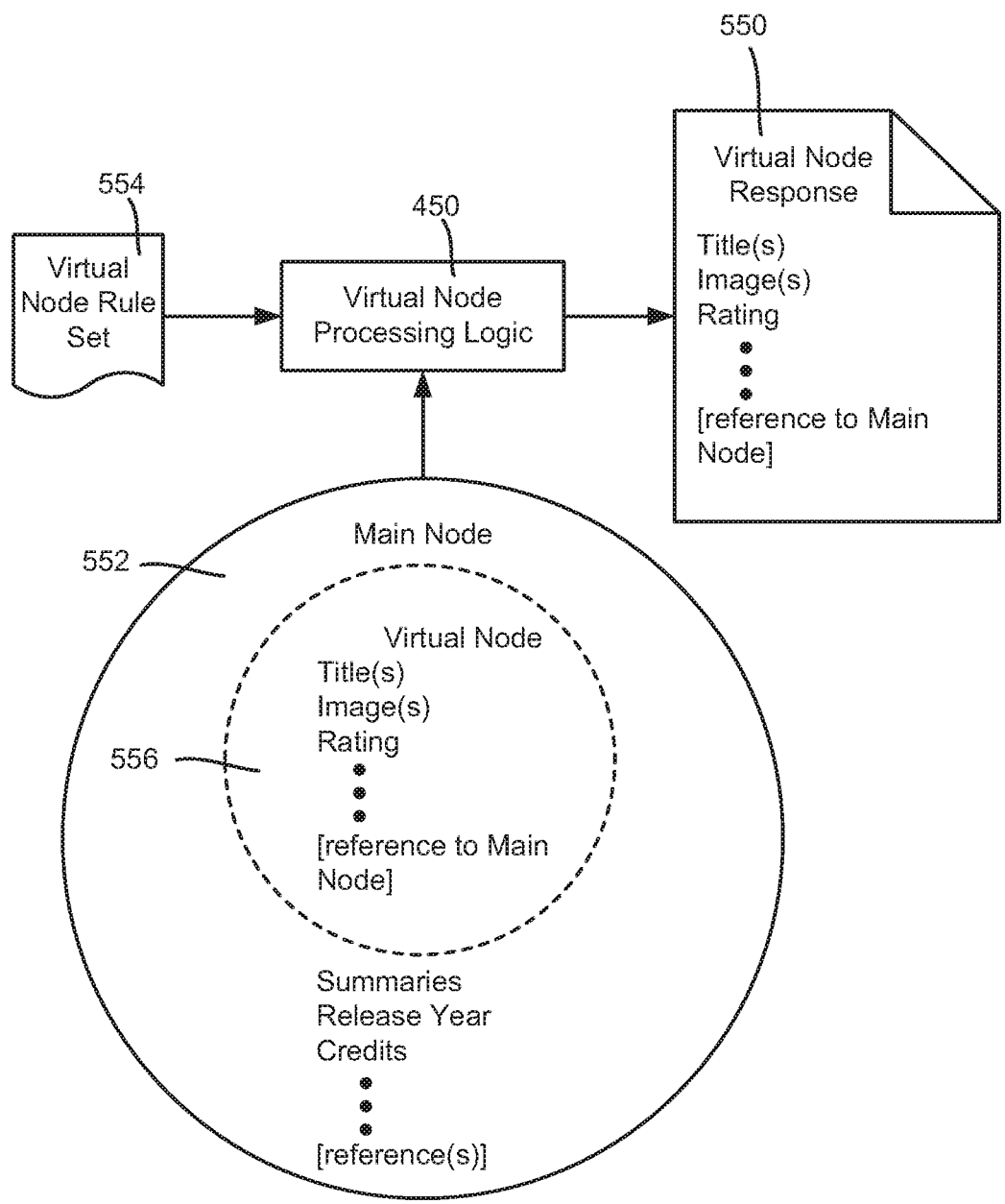
FIG. 5 is an example representation of processing main node data into a virtual node response, according to one or more example implementations.

FIG. 5 exemplifies how a virtual node response 550 may be extracted from data of a main node 552. In general, an instance of the virtual node processing logic 450 applies an appropriate instance of a rule set 554 to determine what data 556 of the main node 532 to include and/or exclude, as well as any data to mutate and/or add from another source. A rule set may be a single instruction for all virtual nodes of the same type, e.g., "remove the credits" from the main node, or may be as complex as desired, as well as being based upon the type of client device, type of network connection, bandwidth and so forth. Note that FIG. 5 is only for purposes of illustration, and that the actual structuring/ordering of the virtual node data may be non-contiguous/interleaved in any manner within the other main node data. For example, the titles' data may be followed by summaries' data and then the images' data (URLs).

The following exemplifies one possible example of a main node response, followed by its corresponding virtual node response, in which as can be seen, the virtual node response comprises a reduced subset of the main node response's data along with a reference to the main node:

Main Node Response:

```
{
    "id": "urn:hbo:feature:GVhxAxgVh5ZRpwnAKAABm",
    "statusCode": 400,
    "headers": {
        "ETag": "\"b42-OK+jqM3eile9GpXf1m+7fg\"",
        "Cache-Control": "max-age=12190"
    },
    "body": {
        "titles": {
            "short": "Baby's Day Out",
            "full": "Baby's Day Out"
        },
        "summaries": {
            "short": "Three klutzy kidnappers grab a wealthy couple's baby, only to have the
                toddler escape and lead them on a slapstick chase all over Chicago.",
            "full": "When three klutzy kidnappers grab a wealthy couple's baby, they think
                the $5 million ransom is a sure thing. Wrong! The nine-month-old escapes, and
                leads the trio on a slapstick chase around Chicago, getting into one dangerous
                situation after another that always end badly for the bad guys."
        },
        "images": {
            "largeTile":
                "https://artist.api.lv3.cdn.hbo.com/images/GVhxAxgVh5ZRpwnAKAABm/detail?
                v=NbNDapPBrYVTpYYNKPU6ug&size=1280x720&format=jpg",
            "mediumTile":
                "https://artist.api.lv3.cdn.hbo.com/images/GVhxAxgVh5ZRpwnAKAABm/detail?
                v=NbNDapPBrYVTpYYNKPU6ug&size=374x210&format=jpg",
            "smallTile":
                "https://artist.api.lv3.cdn.hbo.com/images/GVhxAxgVh5ZRpwnAKAABm/detail?
                v=NbNDapPBrYVTpYYNKPU6ug&size=280x158&format=jpg",
            "background":
                "https://artist.api.lv3.cdn.hbo.com/images/GVhxAxgVh5ZRpwnAKAABm/backgr
                ound?v=GSREhVKMCRYSEc5J9KThCA&size=1920x1080&format=jpg"
        },
        "isFree": false,
        "releaseYear": 1994,
        "ratingCode": "PG",
        "credits": {
            "cast": [{
                "role": "Eddie",
                "person": "Joe Mantegna"
            }, {
                "role": "Laraine Cotwell",
                "person": "Lara Flynn Boyle"
```

```
            }, {
                "role": "Norby",
                "person": "Joe Pantoliano"
            }],
            "directors": [{
                "role": "Directed By",
                "person": "Patrick Read Johnson"
            }],
            "producers": [{
                "role": "Producer",
                "person": "John Hughes"
            }, {
                "role": "Producer",
                "person": "Richard Vane"
            }, {
            "role": "Executive Producer",
            "person": "William Ryan"
            }],
            "writers": [{
            "role": "Written by",
            "person": "John Hughes"
            }]
        },
        "musicBy": [
            "Bruce Broughton"],
        "soundtrack": [{
            "title": "This Is the Army, Mr. Jones",
            "composers": [
            "Irving Berlin"]
        }],
        "analyticsId": "GVhxAxgVh5ZRpwnAKAABm",
        "playbackMarkerId": "GVhxAxgVh5ZRpwnAKAABm",
        "references": {
            "edits": [
                "urn:hbo:edit:GVjqhTA6WKGwxwpoKAABY:feature:GVhxAxgVh5ZRpwnAKA
                ABm"],
            "previews": [
                "urn:hbo:edit:GVhxAxgZLMMITwy0KAAB:preview:GVhxAxgXD6ouuJyYKAA
                CM:feature:GVhxAxgVh5ZRpwnAKAABm"]
        }
    }
}
```

Virtual Node Response (the "References" Data at the End
References the Main Node ID):

```
{
    "id": "urn:hbo:tile:GVhxAxgVh5ZRpwnAKAABm:type:feature",
    "statusCode": 400,
    "headers": {
        "ETag": "\"396-nnRrH5jlhi7qyHK5S1lvQw\"",
        "Cache-Control": "max-age=21532"
    },
    "body": {
        "titles": {
            "short": "Baby's Day Out",
            "full": "Baby's Day Out"
        },
        "images": {
            "largeTile":
            "https://artist.api.lv3.cdn.hbo.com/images/GVhxAxgVh5ZRpwnAKAABm/detail?
            v=NbNDapPBrYVTpYYNKPU6ug&size=1280x720&format=jpg",
            "mediumTile":
            "https://artist.api.lv3.cdn.hbo.com/images/GVhxAxgVh5ZRpwnAKAABm/detail?
            v=NbNDapPBrYVTpYYNKPU6ug&size=374x210&format=jpg",
            "smallTile":
            "https://artist.api.lv3.cdn.hbo.com/images/GVhxAxgVh5ZRpwnAKAABm/detail?
            v=NbNDapPBrYVTpYYNKPU6ug&size=280x158&format=jpg",
            "background":
            "https://artist.api.lv3.cdn.hbo.com/images/GVhxAxgVh5ZRpwnAKAABm/backgr
            ound?v=GSREhVKMCRYSEc5J9KThCA&size=1920x1080&format=jpg"
        },
        "ratingCode": "PG",
        "isFree": false,
        "playbackMarkerId": "GVhxAxgVh5ZRpwnAKAABm",
        "sortString": "baby s day out",
```

```
        "references": {
            "viewable": "urn:hbo:feature:GVhxAxgVh5ZRpwnAKAABm"
        }
    }
}
```

Although it is possible to have a single way to process main nodes into virtual nodes for any situation, in one or more implementations, different virtual node rules for reducing the main node data may be used for different virtual nodes/node types, client device classes or device types and/or software versions. For example, a tile for a low-powered device type may have a virtual node rule specifying that only a single ("smallTile") image reference (e.g., URL) be returned in the virtual node, whereas the same virtual node for another device may contain "smallTile" "mediumTile" "LargeTile" and "Background" image references. Rules or the like based upon the device types and/or software version may be applied to customize device type and/or software version virtual node processing. An example rule may specify what to include and/or exclude, mutate and/or add, e.g., "include titles, images, ratingCode, isFree, playbackMarkerId and sortString plus reference" or "include titles, images, ratingCode, isFree, playbackMarkerId and sortString plus main node reference" or "include titles, images (exclude largeTile), ratingCode, isFree, playbackMarkerId and sortString plus main node reference" and so forth. Information may be added "rule 1: add text to indicate that this movie just received an award" and/or other information may be mutated "rule 4: replace image URL X with image URL Y."

Turning to aspects and additional details related to returning expanded nodes in response to a request, in one or more implementations, requests are expanded at the data service side. This allows rules to be determined for a large number users, e.g., based upon statistics that reduce overall resource consumption. Note that requests are not expanded at the client device, although it is feasible to do so (instead of or in addition to server-side expansion).

Figure 6:
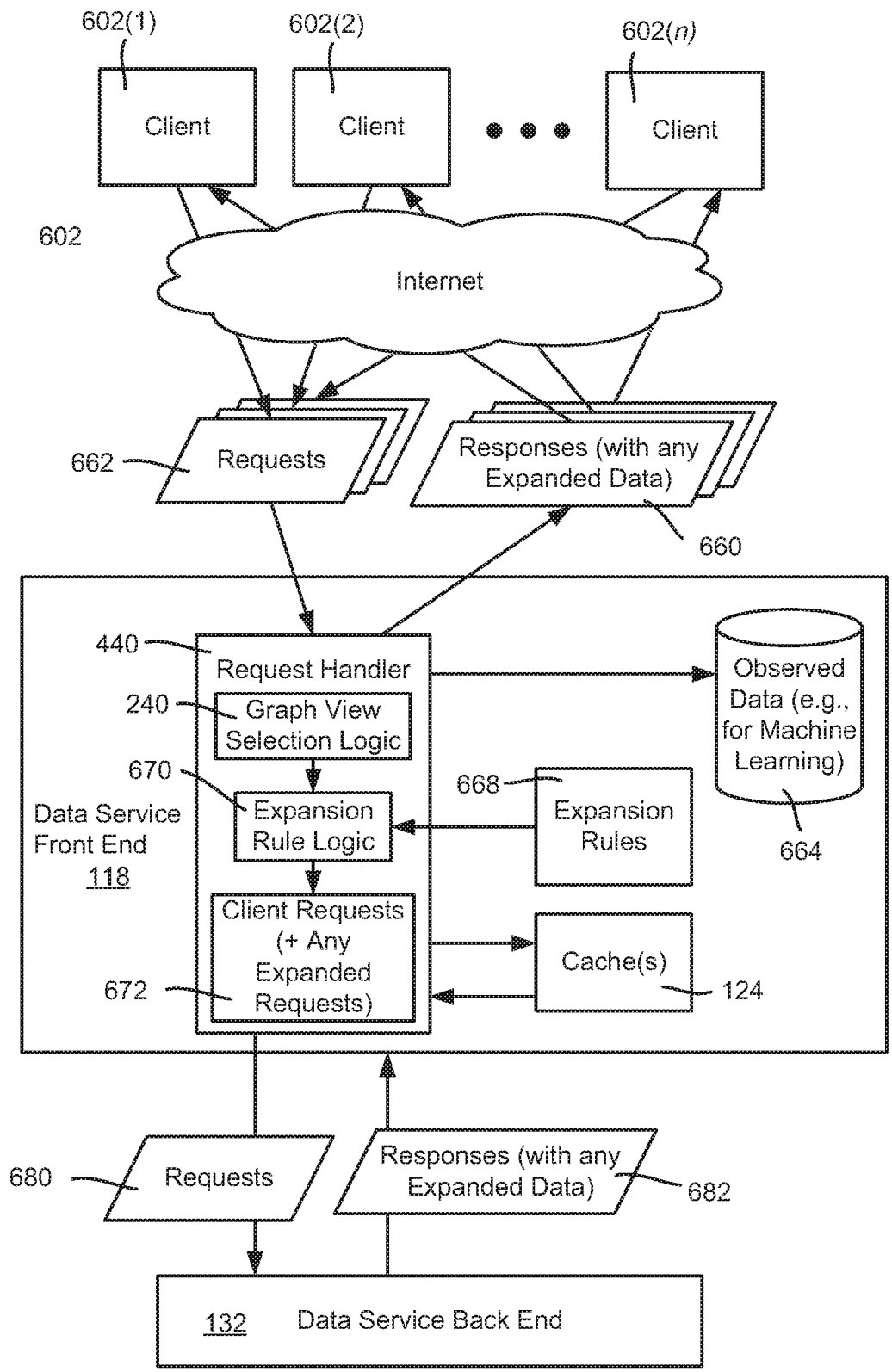
FIG. 6 is an example block diagram representation of a data service's expansion of client requests to obtain expanded provider data, according to one or more example implementations.

FIG. 6 shows an example of expansion of data request sets 662 from clients 602(1)-602(n) at a data service, e.g., the front-end portion 118. Note that each client may send a request set that requests a single provider (e.g., main graph node or virtual graph node), or a batch request that identifies multiple providers. For each requested provider, the client's request set may be expanded on a per-provider basis, per-type of provider basis, and so on as described herein. Received requests can be logged as observed data 664, e.g., to machine learn what each client requests next to build up expansion rules 668 based upon client behaviors.

In general, request handling logic (request handler 440) receives each request set from each client and responds to the request set. The request handler 440 incorporates or is coupled to the graph view selection logic 240, as well as expansion rule logic 670, (including whether the expansion rule logic 670 is incorporated into the request handling logic 440 as depicted in FIG. 6 or is a separate component). The expansion rule logic 670 accesses the expansion rules 668 to (possibly) expand the request set for that client into what may be an expanded request set 672. The graph view selection logic 240 may specify how many expanded nodes are to be returned, which may be zero, as well as whether any expanded node is to be virtual or a main node. The determination of expansion nodes made by the graph view selection logic 240 can supersede the expansion rules 668.

An expansion rule may be selected based upon the provider ID or provider type, in conjunction with the requesting client device type and/or software version. Note that an expansion rule may specify to not expand a request, whereby the client request set is not expanded; (it is also feasible to have the absence of an expansion rule indicate that the client request set is not to be expanded). Again, however, the graph view selection logic 240 can override such a rule.

Rules may be based upon previously observed behaviors, e.g., from prior data logs, which may be adapted to any criteria, such as time of day, day of week, and so on to use different sets of expansion rules, or include criteria in the rules themselves. Additional information, if associated with or determinable from a request, may be used in expanding that request. For example, consider that users under twenty-five years old have a statistically high tendency to request item R right after requesting data item Q. Thus, if a client user that sends a request falls into that age group profile, (based upon information determinable from the client/request), a rule set that expands a [Q] request set into a [Q, R] request set may be selected for that user and other users matching that age profile.

As described above, some (or all) of the requested provider data in the request set 672 may be cached at the data service's front-end cache or caches 124. Those providers that are not cached (or if cached are expired) are retrieved from the data service back end 132, via requests 680 and responses 682 as needed; (note that instead of provider data, an appropriate response to any request may be an error). Response sets 660, which may include expanded data, are returned to each client as appropriate for their respective request or requests; (note that the response set returned to a given client may be streamed in multiple partial result responses rather than in a single response, however for purposes of simplicity a response set may be considered to satisfy a client request, as well as possibly include expanded data).

An expanded response set may be built in a way that eliminates duplicates and/or may be filtered before returning to the client to eliminate duplicates. For example, if a client's batch request for providers A and B is received, and both provider A and provider B have an expansion rule that requests provider C, then only one instance of provider C may be returned in the response set. An alternative is to have a client detect and ignore duplicates, or overwrite one cached entry with identical data. Further, if an expanded request results in an error being returned by the back-end data service, no error need be returned to the client for something the client did not actually request (although it is feasible for the client to simply ignore an error for something not actually requested).

In one or more implementations, once a response set to a client is sent, the data service is stateless with respect to maintaining client information. However, in alternative implementations it is feasible to maintain some client state so as to not return expanded data that was already (e.g., recently) returned. For example, if a client requests item A from the data service and items A and C (expanded) are returned, then a subsequent request for item B that otherwise is also expanded to return item C need not also return item C, (at least for some period of time in which the initially returned item C has not expired). Maintaining such state for clients may be useful in situations in which scalability is not an issue, e.g., where only a relatively small number of clients make requests.

Another possible use of client state data is to detect certain client request patterns, which also may have been previously observed, and use those patterns for expansion. For example, clients who request menu X, and then request menu Y, tend to next request menu Z, but not if they request menu Y in some other way; so a rule may specify to expand Y menu requests into Y, Z menu requests if past state information indicates the Y menu request followed an X menu request; however do not expand client Y menu requests that do not follow X menu requests or the like. Note that instead of maintaining state data at the data service, clients can be configured to send such state information with their request, e.g., send past information from which patterns may be detected.

As can be seen, the response to a request for a provider may be expanded with additional provider data based upon expansion rules 668, as possibly modified by the graph view selection logic 240. The rules may be developed by observing behavior over a number of client requestors, e.g., have machine learning learn usage trends, including what clients tend to request next, and so on. As described herein these rules may be as straightforward or complex as desired by the data service; e.g., "if request provider A, then also return provider B," or "if request provider A, and it is after 9 pm on a Sunday, then also return providers B, C, E, X and Q else return providers B and C." A rule may be generally less static and instead to an extent dependent on external information, e.g., for provider G, select (from a specified storage location) the providers for what are currently the four most requested "Action" movies.

As described herein, expansion rules and/or expansion operations (behavior) may be tailored to different client devices and/or software versions running on those devices, (as well as possibly other criteria). For example, a type of client device such as a modern gaming console or personal computer may receive more expanded data than a different device (such as an older smartphone or internet television device type) that is known to not have much memory. The graph view selection logic as described with reference to FIGS. 2 and 3 can determine expansion operations.

Turning to another aspect, it is feasible to expand upon expanded data requests. For example, consider that a request for some data item (or data item type) X is expanded into a request for data items X and Y. In turn, the request for data item Y may be expanded into a secondary expanded request for data item Z, (to request [X, Y and Z] when only X was actually requested) and so on. As can be readily appreciated, expansion can expand a request to a large number of providers, and thus some practical limit(s) may be applied.

One such limit is to have a rule and/or the graph view selection logic 240 determine a maximum expansion number for a requested provider, e.g., the total number for that data item cannot exceed ten. A default total maximum may be set if not specified; further, the total maximum or default can be the same for each data item or data item type, per device and software version, or may vary amongst data item or data item types for device and software version. Another limit is to have a rule and/or the graph view selection logic 240 establish a maximum depth level for secondary expansion and beyond. Thus, in the above example, a depth level of one (1) may be set so that data item X may be expanded to add data item Y (level 0), data item Y may be expanded to add data item Z (level 1), but data item Z may not be expanded because X's expansion rules set a maximum expansion depth level of one (1), and further expansion would exceed the maximum depth level allowed. Zero (0) may be the default level if not specified, for example, and an entire device class/software version class may have a different default, or may have individually set maximum expansion levels.

Figure 7:
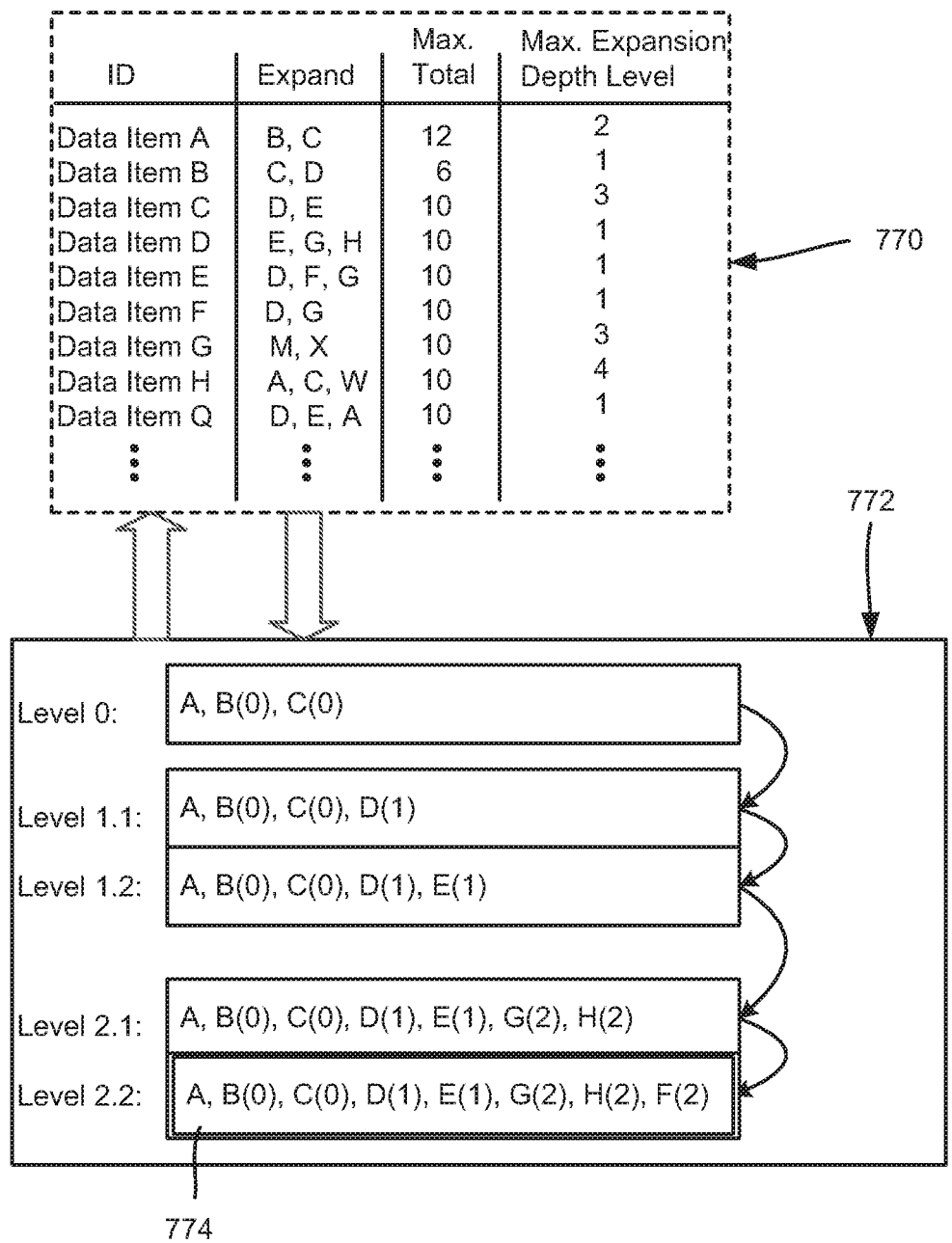
FIG. 7 is an example conceptual representation of expanding requests for data items (e.g., providers) into expanded requests, including expanding upon expanded data items, according to one or more example implementations.

FIG. 7 shows an example of such expansion levels and limits, in which the data items (e.g., providers or provider types) are identified via a single capital letter. For purposes of explanation, instead of showing each rule file separately, a table 770 summarizes the expansion rules for each data item, in terms of which other data item(s) to expand, a maximum total and a maximum expansion depth level. It is understood that such an actual table 770 need not exist, as the information may be specified in each data item's expansion rule file. It is also understood that any expansion levels and limits can be set by or overridden by the graph view selection logic 240.

Thus, for an initial request for data item A, it is seen that as a first level zero (0) expansion, an expanded request set (e.g., a request/expansion data structure such as a list) 772 includes A, B(0) and C(0); (for purposes of explanation, the value in the parentheses after each expanded data item indicates the level at which that item was added). Because neither rule maximum (total of twelve or depth level of two) is met, expansion continues. Note that while a request/expansion list 772 is exemplified, it is understood that any suitable data structure may be used for the expanded request set, such as an array that lists data item identifiers along with including requested (or not yet) and returned (or not yet) status information.

At a first part of the level one (1) expansion, labeled 1.1 in FIG. 7, data item B(0) is expanded into data item D(1); note that data item C is not added again because it already is in the request/expansion list 772. At a second part of the level one (1) expansion, labeled 1.2 in FIG. 7, data item C(0) is expanded into data item E(1); note that data item D is not added again because it already is in the request/expansion list 772. Again, because neither rule maximum (total of twelve or depth level of two) is met, expansion continues.

At a first part of the level two (1) expansion, labeled level 2.1 in FIG. 7, data item D(1) is expanded into data items G(2) and H(2); note that data item E is not added again because it already is in the request/expansion list 772. At a second part of the level two (2) expansion, labeled 2.2 in FIG. 7, data item E(1) is expanded into data item F(2); note that data item D is not added again because it already is in the request/expansion list 772. This time, because the maximum level of depth level of two is met, expansion stops; (had there been another level of expansion, non-duplicate expanded data items for G, H and F would be added, and so on). Thus, the final request/expansion list 774 (after to level 2.2 expansion) contains items [A, B, C, D, E, G, H and F].

Note that while expansion is occurring, the original data item (data item A) as well as other items from the list 774 may be requested and/or returned. For example, while retrieving its rule data, item A may be looked for in the caches, and further requested from the back-end data service if not cached/valid in the front-end cache, and the same with item B, C, and so on. As long as a client gets a response set that has data (or an error) for each requested data item, along with the data of any expanded data item according to the expansion rules, these example operations may be performed in any logical order and with intermediate operations such as lookups and requests made. Thus, the request/expansion list 774 list may be used for other purposes as it is being built, as long as each item remains identified (e.g., maintained while marked as requested and/or returned) for purposes of expansion. For example, when data item E is added by data item C's expansion, data item E may be requested, found in a data service cache and returned before data item E is expanded; data item E is thus not removed from the list, but rather only marked as requested and/or returned in some way. Keeping the item in the list after it has been requested/returned also prevents another data item from relisting the same data item (e.g., data item E) when that other data item gets expanded.

Figure 8:
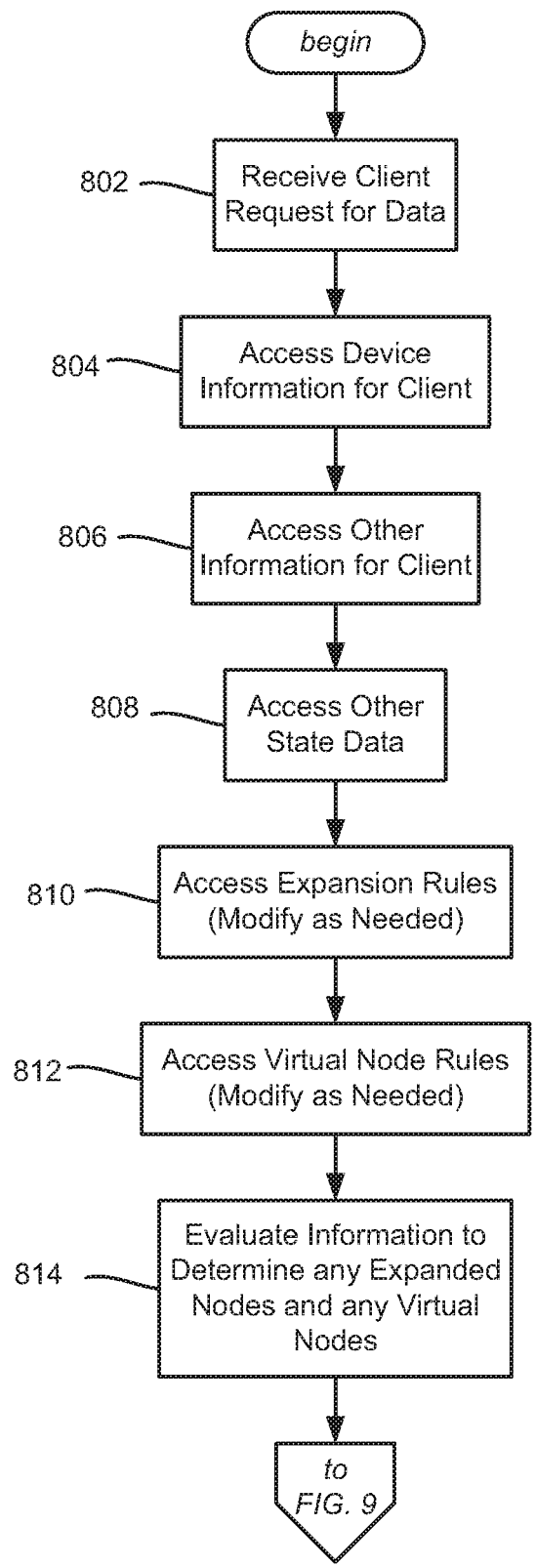
FIGS. 8 and 9 comprise a flow diagram of example operations that may be performed by graph view selection logic to modify a client request for graph node data based on client-specific information and other data, according to one or more example implementations.
Figure 9:
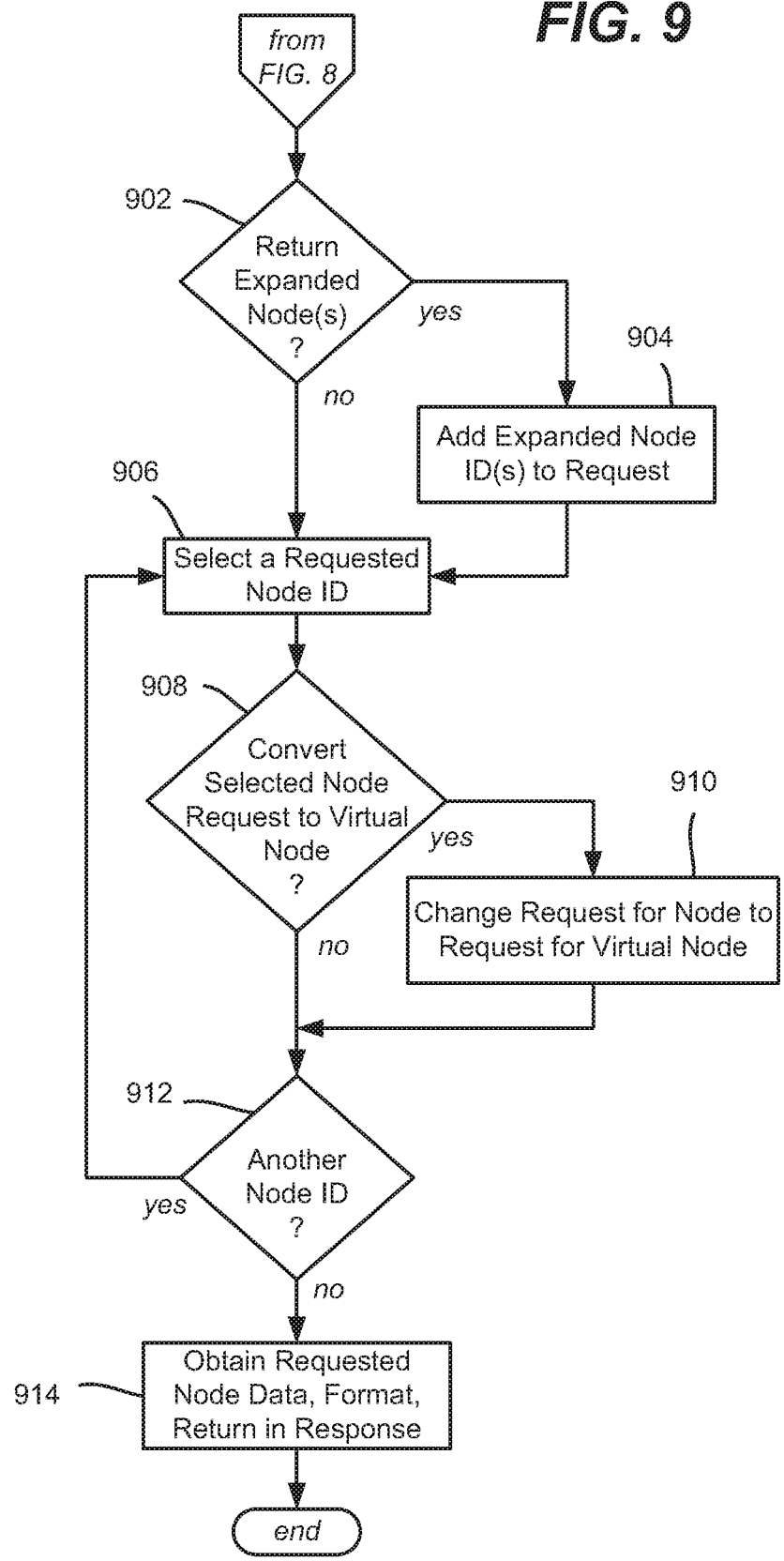

FIGS. 8 and 9 comprise a flow diagram of example operations that may be performed by graph view selection logic. In this example, the graph view selection logic evaluates client-specific and other information in order to determine whether to expand the request into a request for additional nodes, as well as to determine for each node to be returned whether the node is to be returned as a virtual node instead of a main node. Note that these are only examples, and that other operations are feasible.

Operation 802 represents receiving a client request for data, that is, one or more providers corresponding to graph node data. Based on the request, operation 804 represents accessing the device information for the client, e.g., obtained (at least initially) from the device code.

As described above, this may be converted to a score or multiple scores, e.g., a score with respect to returning virtual node(s) and a score with respect to returning expanded node(s), whereby future requests can be efficiently handled with respect to graph view selection.

Operation 806 represents accessing other information for the client such as client profile data, network conditions for this client and so forth; operation 808 represents accessing other state data (e.g., time of day, current and anticipated server load, and so forth). Note that this other information and state data can be combined with any scoring data for the client device to obtain a final score.

Operation 810 represents accessing the expansion rules for this client/device/software version as generally described above. As also described above, the existing expansion rules can be modified by the graph view expansion logic.

Operation 812 represents accessing the virtual node rules for this client/device/software version as generally described above. Again, the existing virtual node rules can be modified by the graph view expansion logic; however some of the virtual node rules, such as what data is to remain, what data to mutate and so forth may be left intact.

Operation 814 represents evaluating the various information to determine any expanded nodes and any virtual nodes. As described herein, expanded node IDs can be added to the request, and main node IDs can be changed to virtual node IDs by the graph view expansion logic.

The example operations continue in FIG. 9, where operation 902 represents evaluating whether any expanded nodes are to be returned, and if so, operation 904 adds the expanded node ID(s) to the request.

Operations 906-912 are directed towards converting any main node requests into virtual node requests. Note that the opposite is possible, e.g., convert a virtual node request into a main node request, although such operations are not shown in FIG. 9 for purposes of brevity. Operation 906 represents selecting a requested node ID, with operation 908 evaluating whether that node ID is to be converted to a request for a virtual node, that is, whether the data returned for the requested node is to be reduced. Note that conversion is not needed if the request for that node is already a request for a virtual node, (although if so, conversion from a virtual node request to a main node request is feasible).

If the selected node ID being request is to be converted to a virtual node request, operation 908 branches to operation 910. Otherwise operation 912 repeats the process for each other node ID. Note that this allows any main node of a suitable type (e.g., "feature"), including an expanded node, to be returned as a virtual node.

Operation 914 represents obtaining the data in a known manner, e.g., from a front end cache if available and not expired, or via a back end request as described above. The data is processed, e.g., main nodes are converted to virtual nodes if the request is for a virtual node and only the main node is available, and formatted for the software version (e.g., a data field not supported by the software version is filtered out), before returning the data as graph node data to the client in response to the request.

Figure 10:
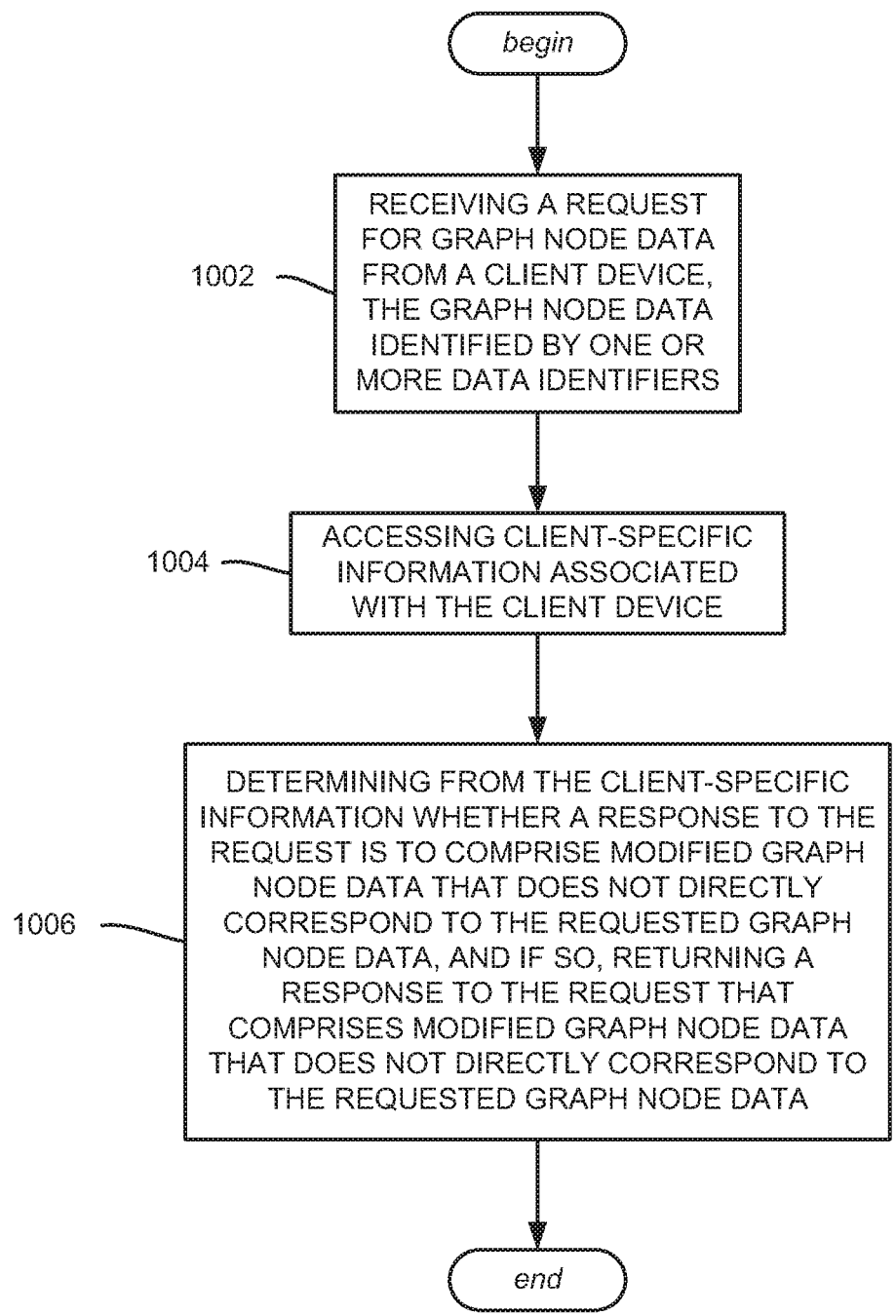
FIG. 10 is a flow diagram of example operations that may be performed by a data server with respect to handling a client request, according to one or more example implementations.

FIG. 10 summarizes various example operations, such as performed by a server having a processor, comprising operation 1002 which represents receiving a request for graph node data from a client device, the graph node data identified by one or more data identifiers. Operation 1004 represents accessing client-specific information associated with the client device. Operation 1006 represents determining from the client-specific information whether a response to the request is to comprise modified graph node data that does not directly correspond to the requested graph node data, and if so, returning a response to the request that comprises modified graph node data that does not directly correspond to the requested graph node data.

Determining (e.g., at operation 1006 from the client-specific information) can indicate that the response to the request is to comprise the modified graph node data; in response, aspects can comprise changing initial information in the request to obtain the modified graph node data instead of the requested graph node data.

The request for the graph node data can comprise a request for a main node, and returning the response to the request that comprises the modified graph node data can comprise returning a virtual node that contains reduced information relative to the main node. Returning the response to the request can comprise returning expanded node data that is not identified by the one or more data identifiers in the request.

An expansion rule can indicate that expanded data is to be returned in response to the request; aspects can comprise modifying the expansion rule based on the client-specific information.

Accessing the client-specific information associated with the client device can comprise accessing information based on a type of the client device. Accessing the client-specific information associated with the client device can comprise accessing software version information of a program of the client device that is making the request for the graph node data. Accessing the client-specific information associated with the client device can comprise accessing information corresponding to network connectivity of the client device.

Figure 11:
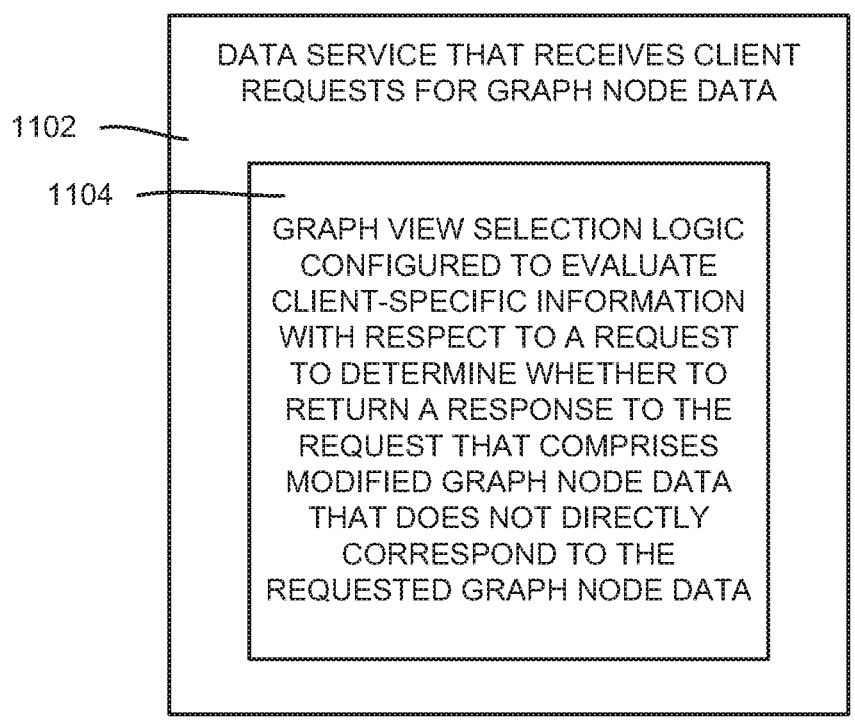
FIG. 11 is a block diagram representation of example components that may be used to select data for returning in response to client requests, according to one or more example implementations.

An example system, represented in FIG. 11, can comprise a data service 1102 that receives client requests for graph node data. The system can comprise graph view selection logic 1104 of the data service 1102, the graph view selection logic 1104 configured to evaluate client-specific information with respect to a request to determine whether to return a response to the request that comprises modified graph node data that does not directly correspond to the requested graph node data. The graph view selection logic 1104 can determine from the client-specific information that the response to the request is to comprise the modified graph node data, and in response, the graph view selection logic can change initial information in the request to obtain the modified graph node data instead of the requested graph node data.

The request for the graph node data can comprise a request for a main node, and the graph view selection logic can operate to return a virtual node that contains reduced information relative to the main node. The graph view selection logic can operate to return expanded node data that is not identified by the one or more data identifiers in the request.

An expansion rule can indicate that expanded data is to be returned in response to the request, and the graph view selection logic can operate to modify the expansion rule based on the client-specific information.

The client-specific information can comprise information associated with a type of the client device. The client-specific information can comprise information associated with network connectivity of the client device. The client-specific information can comprise information corresponding to user preference data.

At least part of the client-specific information can be obtained from an authorization token received in conjunction with the client request for the graph node.

Figure 12:
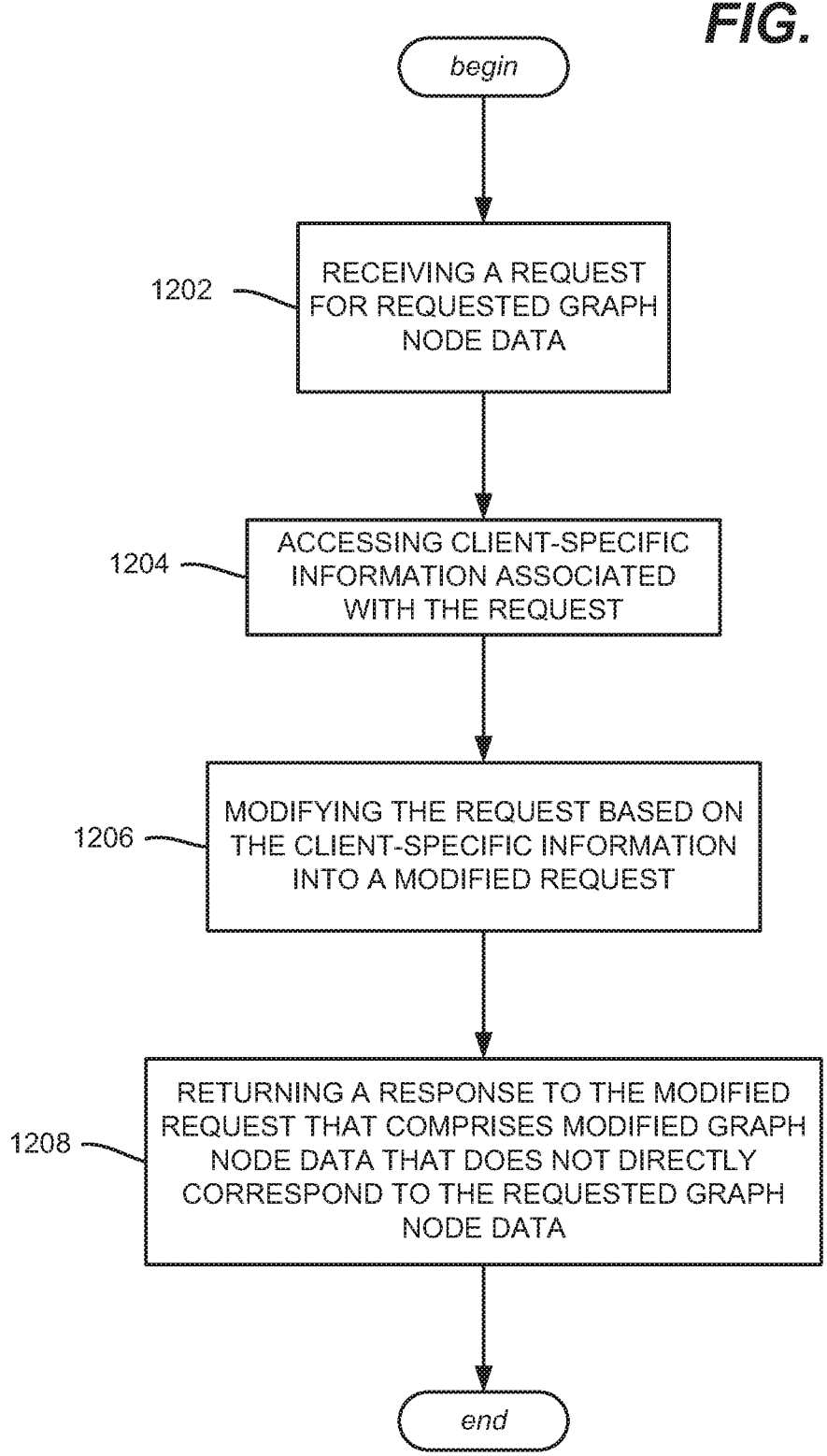
FIG. 12 is a flow diagram of example operations that may be performed by a data server with respect to modifying a client request for returning modified graph data to the client, according to one or more example implementations.

Other operations are represented in FIG. 12; such other operations, for example, can be implemented via a machine-readable storage medium, comprising executable instructions that, when executed by a processor, facilitate performance of the operations. Operation 1202 represents receiving a request for requested graph node data. Operation 1204 represents accessing client-specific information associated with the request. Operation 1206 represents modifying the request based on the client-specific information into a modified request. Operation 1208 represents returning a response to the modified request that comprises modified graph node data that does not directly correspond to the requested graph node data.

Modifying the request based on the client-specific information into the modified request can comprise changing the request to request a virtual node in place of a requested main node, and/or changing the request to request an expanded node.

Aspects can comprise overriding an expansion rule that otherwise determines handling of expanded graph node data.

As can be seen, described is a technology by which client-specific information (and possibly other information) can be used to better optimize perceived responsiveness at a client device user interface. The graph view that is selected by the data service for a response to a client request can reduce the amount of information downloaded for a graph node, as well as reduce the number of requests for additional graph node information by returning expanded node data for client caching before it is actually to be requested.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
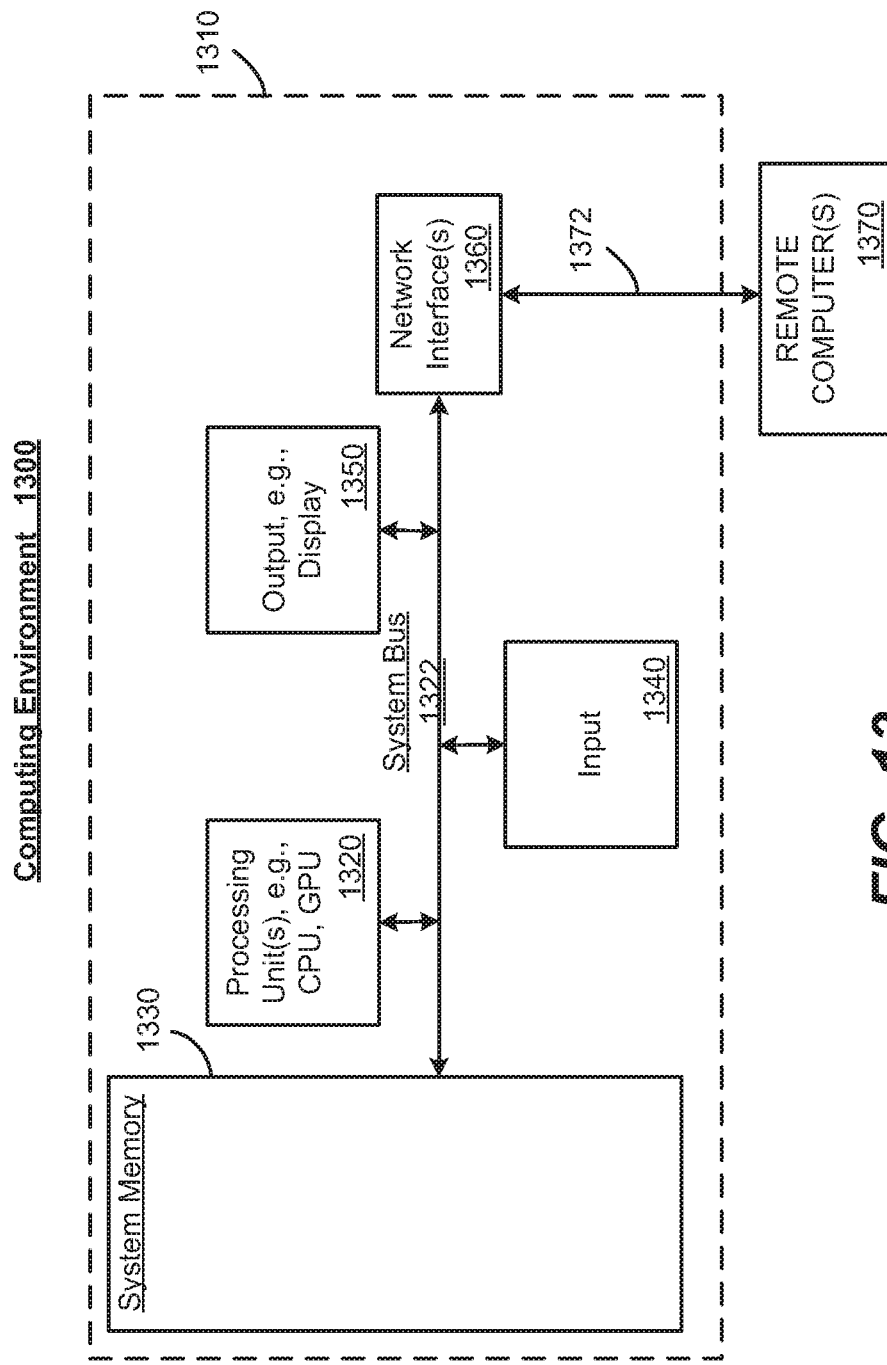
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth. By way of example, and not limitation, system memory 1330 may also include an operating system, application programs, other program modules, and program data.

A user can enter commands and information into the computer 1310 through one or more input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

Conclusion

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
preloading, by a system comprising a processor, future graph node data comprising respective graphs mapped to respective client device-specific information, the future graph node data preloaded into cache memory prior to becoming active graph node data for responding to a request for active graph node data;
changing, by the system, the future graph node data to the active graph node data, based on time data associated with the future graph node data and current time;
receiving, by the system, the request for active graph node data from a client device, the active graph node data identified by at least one data identifier;
accessing, by the system, client device-specific information describing the client device, wherein the client device-specific information comprises size data representative of a size of a cache in the client device;
based on the client device-specific information:
determining, by the system, that a response to the request is to comprise modified graph node data that comprises a subset of the active graph node data that does not comprise all of the active graph node data, and
returning, by the system, the response to the request that comprises the modified graph node data, wherein a size of the response to the request is based on the size data for the client device.

2. The method of claim 1, further comprising changing, by the system, initial information in the request to obtain the modified graph node data.

3. The method of claim 1, wherein the active graph node data comprises a main node, and the subset of the active graph node data comprises a virtual node that contains reduced information relative to the main node.

4. The method of claim 1, further comprising:
determining, by the system, based on learned data, that the response to the request is to comprise expanded graph node data that is not identified by the at least one data identifier in the request, wherein the expanded graph node data is based on additional client device-specific information comprising historical data or user profile data, and wherein the size of the response to the request comprising the expanded graph node data is based on the size data for the client device, and
wherein an expansion rule indicates that the expanded graph node data is to be returned in response to the request, and further comprising, modifying the expansion rule based on the client device-specific information.

5. The method of claim 1, wherein the client device-specific information further comprises a type of the client device.

6. The method of claim 1, wherein the client device-specific information further comprises software version information of a program of the client device that is making the request for the graph node data.

7. The method of claim 1, wherein the client device-specific information comprises further information corresponding to network connectivity of the client device.

8. The method of claim 1, further comprising:
after returning the response to the client device, maintaining, by the system, client information to employ in a determination of avoiding returning a future response with duplicate graph node data of the response.

9. A system, comprising:
a processor; and
a memory that stores executable instructions that, when executed by the processor, facilitate performance of operations, comprising:
preloading future graph node data comprising respective graphs mapped to respective client device-specific information, the future graph node data preloaded into cache memory prior to becoming active graph node data for responding to a request for active graph node data;
changing the future graph node data to the active graph node data, based on time data associated with the future graph node data and current time;
receiving a request for active graph node data;
based on client device-specific information describing a client device making the request, wherein the client device-specific information comprises latency data representative of a latency of a network connection to the client device:
determining that a response to the request will comprise modified graph node data that comprises a portion of the active graph node data that does not comprise all of the active graph node data, and
returning the response to the request that comprises the modified graph node data, wherein a size of the response to the request is based on size data representative of a size of a cache in the client device, of the client device-specific information; and
further determining based on learned data that the response to the request is to comprise expanded graph node data that is not identified by the at least one data identifier in the request, wherein the size of the response to the request comprising the expanded graph node data is based on the size data for the client device.

10. The system of claim 9, wherein the operations further comprise altering initial information in the request to obtain the modified graph node data.

11. The system of claim 9, wherein the request for the graph node data comprises a request for a main node, and the portion of the active graph node data comprises a virtual node that contains reduced information relative to the main node.

12. The system of claim 9, wherein an expansion rule indicates that the expanded graph node data is to be returned in response to the request, wherein the expanded graph node data is based on additional client device-specific information comprising historical data or user profile data, and wherein the graph view selection logic operates to modify the expansion rule based on the client device-specific information.

13. The system of claim 9, wherein the client device-specific information further comprises a type of the client device.

14. The system of claim 9, wherein the client device-specific information further comprises a bandwidth of the network connection to the client device.

15. The system of claim 9, wherein the client device-specific information further comprises information corresponding to user preference data.

16. The system of claim 9, wherein at least part of the client device-specific information is obtained from an authorization token received in conjunction with the request for the graph node data.

17. The method of claim 9, further comprising:
after returning the response to the client device, maintaining, by the system, client information to employ in a determination of avoiding returning a future response with duplicate graph node data of the response.

18. A non-transitory machine-readable medium, comprising executable instructions that, when executed by a processor of a system, facilitate performance of operations, comprising:
preloading future graph node data comprising respective graphs mapped to respective client device-specific information, the future graph node data preloaded into cache memory prior to becoming requested graph node data for responding to a request for requested graph node data;
changing the future graph node data to the requested graph node data, based on time data associated with the future graph node data and current time;
receiving a request for the requested graph node data;
accessing client device-specific information describing a client device making the request, wherein the client device-specific information comprises a type of network connection to the client device;
modifying the request based on the client device-specific information into a modified request;
returning a response to the request that comprises modified graph node data that comprises a fraction of the requested graph node data that does not comprise all of the requested graph node data, wherein a size of the response to the request is based on size data for the client device, of the client device-specific information;

further determining based on learned data that the response to the request is to comprise expanded graph node data that is not identified by the at least one data identifier in the request, wherein the expanded graph node data is based on additional client device-specific information comprising historical data or user profile data, and wherein the size of the response to the request comprising the expanded graph node data is based on the size data representative of a size of a cache in the client device.

19. The non-transitory machine-readable medium of claim 18, wherein the client device-specific information further comprises a type of the client device.

20. The non-transitory machine-readable medium of claim 18, wherein the client device-specific information further comprises software version information of a program of the client device that is making the request for the requested graph node data.

\* \* \* \* \*